(12) United States Patent
Sayenko et al.

(10) Patent No.: US 11,540,167 B2
(45) Date of Patent: Dec. 27, 2022

(54) METHOD AND APPARATUS FOR EFFICIENTLY PERFORMING CONGESTION CONTROL IN MOBILE COMMUNICATION SYSTEM NETWORK

(71) Applicant: Samsung Electronics Co., Ltd., Suwon-si (KR)

(72) Inventors: Alexander Sayenko, Seoul (KR); Donggun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 16/635,344

(22) PCT Filed: Jul. 27, 2018

(86) PCT No.: PCT/KR2018/008502
§ 371 (c)(1),
(2) Date: Jan. 30, 2020

(87) PCT Pub. No.: WO2019/031739
PCT Pub. Date: Feb. 14, 2019

(65) Prior Publication Data
US 2020/0374745 A1    Nov. 26, 2020

(30) Foreign Application Priority Data
Aug. 11, 2017    (KR) ........................ 10-2017-0102210

(51) Int. Cl.
*H04W 28/02*    (2009.01)
*H04L 47/26*    (2022.01)

(52) U.S. Cl.
CPC ... *H04W 28/0289* (2013.01); *H04W 28/0284* (2013.01)

(58) Field of Classification Search
None
See application file for complete search history.

(56) References Cited

U.S. PATENT DOCUMENTS 9,414,255 B2    8/2016   Baillargeon
9,548,930 B1 *  1/2017   Hardie .................... H04L 47/11
(Continued)

FOREIGN PATENT DOCUMENTS

EP    2 536 201 A1    12/2012
EP    2 882 221 A1    6/2015
(Continued)

OTHER PUBLICATIONS

K. Ramakrishnan, et.al., RFC3168: The Addition of Explicit Congestion Notification (ECN) to IP, Sep. 2001, Network Working Group Request for Comments: 3168, 63 Pages. (Year: 2001).*
(Continued)

*Primary Examiner* — Ajit Patel
*Assistant Examiner* — Liem H. Nguyen
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention relates to a method and an apparatus for efficiently performing congestion control in a mobile communication system network.

16 Claims, 16 Drawing Sheets

(56) References Cited

U.S. PATENT DOCUMENTS

| | | | | |
|---|---|---|---|---|
| 2004/0190449 A1* | 9/2004 | Mannal | ............... | H04L 47/283 370/229 |
| 2005/0041581 A1* | 2/2005 | Kuusinen | ............ | H04W 28/18 370/329 |
| 2006/0176810 A1 | 8/2006 | Kekki | | |
| 2011/0032935 A1* | 2/2011 | Yang | ............... | H04L 47/263 370/389 |
| 2012/0051216 A1* | 3/2012 | Zhang | ............... | H04W 52/343 370/230 |
| 2012/0147750 A1* | 6/2012 | Pelletier | ............ | H04L 47/12 370/235 |
| 2012/0307634 A1 | 12/2012 | Zhu | | |
| 2014/0016461 A1* | 1/2014 | Ishikawa | ............ | H04L 47/17 370/230 |
| 2014/0036667 A1* | 2/2014 | Balasubramanian | ... | H04L 47/26 370/230 |
| 2014/0233390 A1* | 8/2014 | Schmid | ............ | H04W 28/0284 370/236 |
| 2014/0321289 A1* | 10/2014 | Liu | ............ | H04L 47/17 370/237 |
| 2015/0195202 A1* | 7/2015 | Ogura | ............ | H04W 28/02 370/236 |
| 2017/0142609 A1 | 5/2017 | Balasubramanian et al. | | |
| 2017/0257797 A1* | 9/2017 | Sakai | ............ | H04W 28/18 |
| 2017/0311170 A1 | 10/2017 | Jang et al. | | |
| 2019/0319882 A1* | 10/2019 | Yuan | ............ | H04L 47/28 |
| 2020/0374745 A1* | 11/2020 | Sayen | ............ | H04W 28/0284 |

FOREIGN PATENT DOCUMENTS

| | | |
|---|---|---|
| KR | 10-0949245 B1 | 3/2010 |
| KR | 10-2010-0090362 A | 8/2010 |
| KR | 10-2013-0105847 A | 9/2013 |
| KR | 10-2017-0119940 A | 10/2017 |
| WO | 2011/025438 A1 | 3/2011 |

OTHER PUBLICATIONS

Extended European Search Report dated Apr. 24, 2020, issued in European Application No. 18844159.6.

* cited by examiner

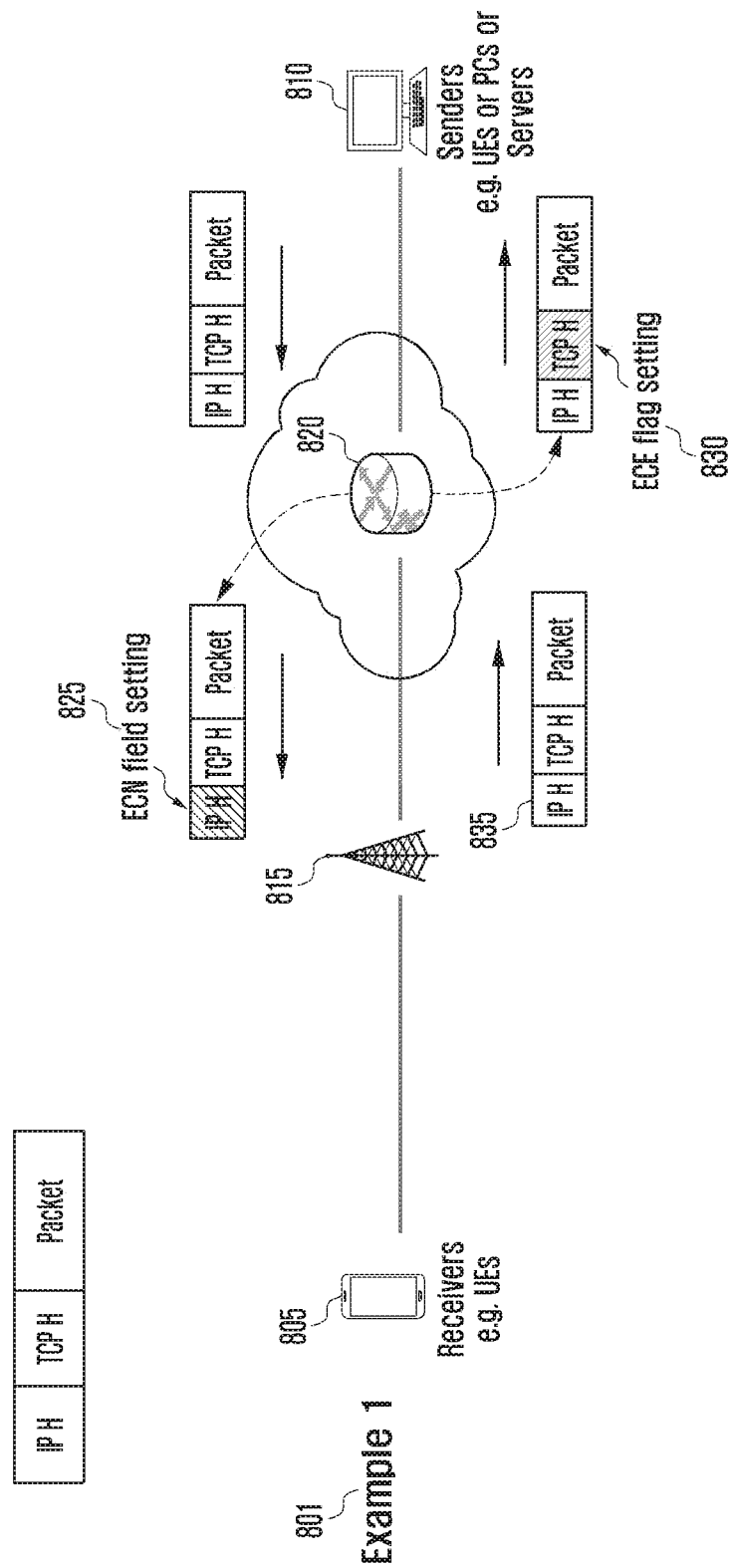

METHOD AND APPARATUS FOR EFFICIENTLY PERFORMING CONGESTION CONTROL IN MOBILE COMMUNICATION SYSTEM NETWORK

TECHNICAL FIELD

The disclosure relates to the operation of a mobile communication system base station, a router, a gateway, and a UE.

The disclosure relates to a method and an apparatus for efficiently performing congestion control in a mobile communication system network.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

When congestion occurs in a mobile communication system network, network apparatuses responsible for packet transfer, such as a router or a gateway of the network, may use up to the capacity limit of a buffer for storing packets and may control congestion by randomly discarding packets before reaching the capacity limit. In another method, when the occurrence of congestion may be reported to a receiver using an indicator, the receiver may report the occurrence of congestion to a transmitter using an indicator if detecting the occurrence of congestion, thus reducing the packet transmission rate of the transmitter. However, randomly discarding packets in a network having congestion cannot be a fundamental solution because traffic due to future retransmission occurs again. Further, the method of reporting the occurrence of congestion using an indicator may delay the transmission of the indicator in a congested network. Therefore, it is required to provide an improved method and apparatus for efficiently performing congestion control in a mobile communication system network.

Solution to Problem

To solve the foregoing problem, an embodiment of the disclosure provides an operating method of a network apparatus, the method including: determining whether congestion occurs; determining whether congestion control is supported based on a downlink packet related to the congestion in case that the congestion occurs; identifying an uplink packet related to the congestion in case that the congestion control is supported; and updating a congestion-related field of a header of the identified uplink packet.

Further, an embodiment of the disclosure provides a network apparatus including: a transceiver configured to transmit and receive a signal; and a controller configured to perform control to: determine whether congestion occurs; determine whether congestion control is supported based on a downlink packet related to the congestion in case that the congestion occurs; identify an uplink packet related to the congestion in case that the congestion control is supported; and update a congestion-related field of a header of the identified uplink packet.

Advantageous Effects of Invention

An embodiment of the disclosure proposes and specifies, as a method for efficiently performing congestion control in a mobile communication system network, a method of reporting the occurrence of congestion to both a receiver and a transmitter using an indicator in case that a base station, a router, or a network packet transfer device detects the occurrence of congestion, thereby quickly and efficiently performing congestion control.

BRIEF DESCRIPTION OF DRAWINGS

FIGS. 8A, 8B, and 8C illustrate embodiment 2-2 of controlling congestion in a mobile communication network according to the disclosure;

MODE FOR THE INVENTION

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

As used in the following description, a term for identifying an access node, terms referring to network entities, terms referring to messages, a term referring to an interface between network objects, and terms referring to various pieces of identification information are illustrated for convenience of explanation. Therefore, the disclosure is not limited by the following terms, and other terms referring to objects having equivalent technical meanings may be used.

For convenience of explanation, the disclosure uses terms and words defined in the third generation partnership project long term evolution (3GPP L 1E) standard. However, embodiments of the disclosure are not limited by these terms and words and may be equally applied to systems in accordance with other standards. In the disclosure, eNB may be used interchangeably with gNB for convenience of explanation. That is, an eNB illustrated as a base station may refer to a gNB.

Figure 1A:
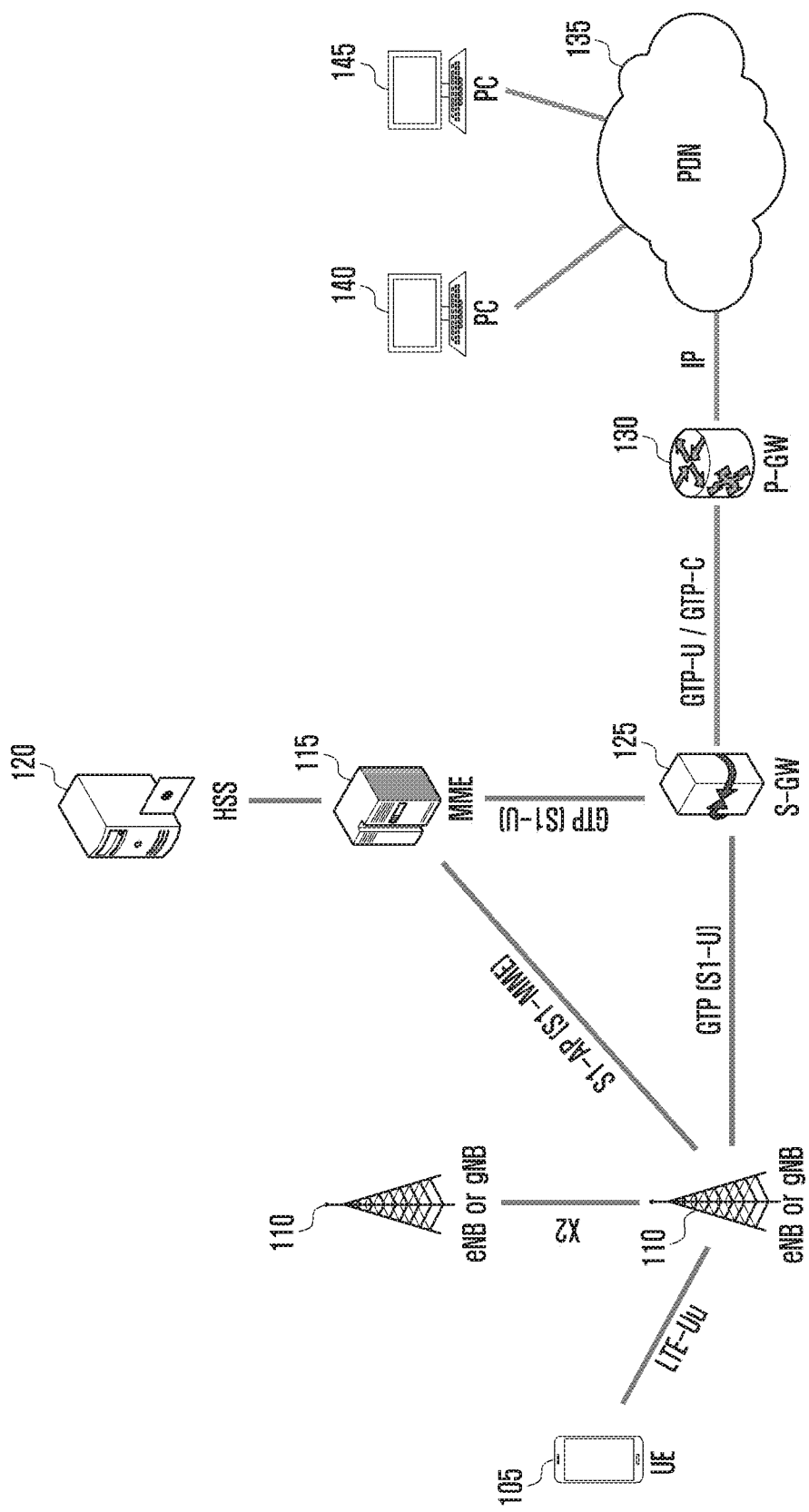
FIG. 1A and FIG. 1B illustrate an example of a mobile communication network according to an embodiment of the disclosure.
Figure 1B:
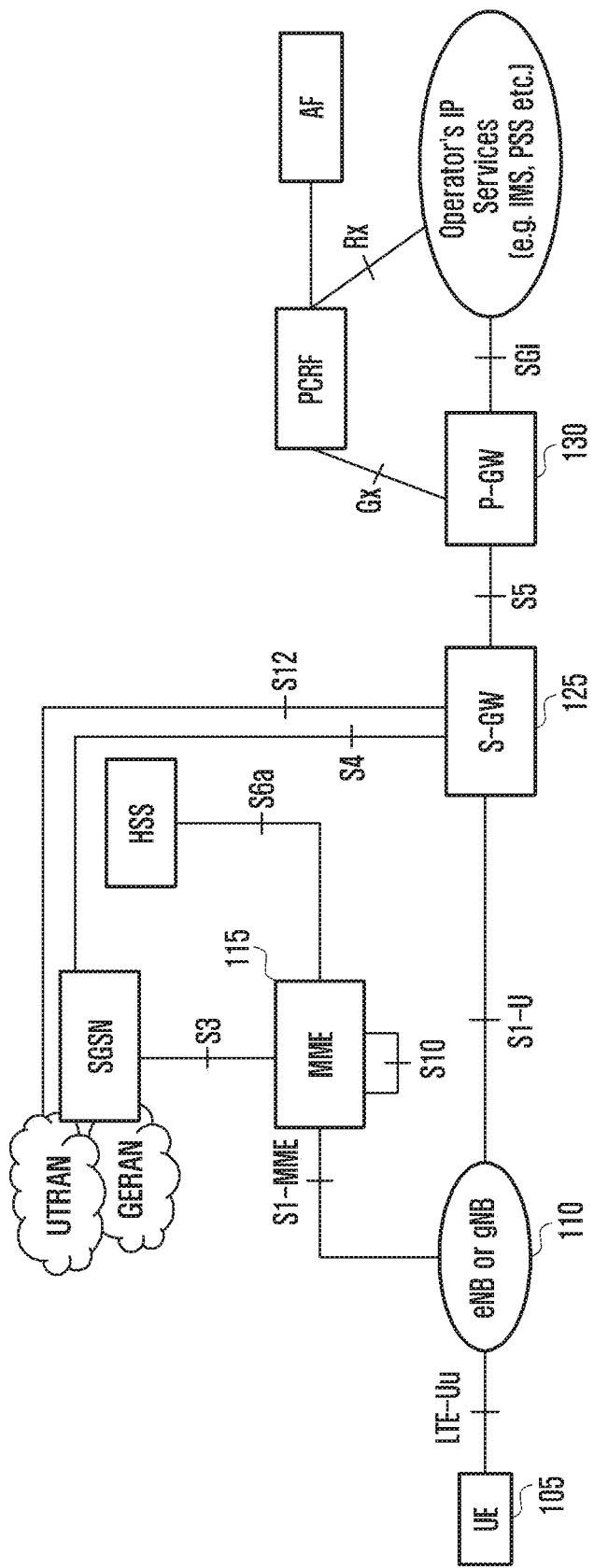

FIG. 1A and FIG. 1B illustrate an example of a mobile communication network according to an embodiment of the disclosure. Hereinafter, FIG. 1A and FIG. 1B are referred to as FIG. 1.

In the mobile communication network of FIG. 1, a UE 105 may access a base station (eNB or gNB) 110 through an LTE-Uu radio interface. The LTE-Uu radio interface is a radio interface between the UE 105 and the base station 110, defines a control plane and a user plane, and provides data transmission and reception and services corresponding thereto. The base station 110 provides a radio interface for a user and provides radio resource management (RRM) functions, such as radio bearer control, radio access admission control, dynamic radio resource allocation, load balancing, inter-cell interference coordination. A mobility management entity (MME) 115 is an evolved-UMTS terrestrial radio access network (E-UTRAN) control plane device, communicates with a home subscriber server (HSS) 120 for user authentication and user profile download, and provides an evolved packet system (EPS) mobility management (EMM) function and an EPS session management (ESM) function to the UE 105 through non-access stratum (NAS) signaling. A serving gateway (S-GW) 125 is an endpoint of an E-UTRAN and an evolved packet core (EPC). That is, the S-GW 125 is an anchoring point in handover between base stations and handover between 3GPP systems. A PDN-gateway (P-GW) 130 connects the UE to an external packet data network (PDN) and provides packet filtering. The P-GW 130 allocates an IP address to the UE 105 and operates as a mobility anchoring point in handover between a 3GPP system and a non-3GPP system. The HSS 120 is a central database having a user profile and provides user authentication information and a user profile to the MME.

Figure 2A:
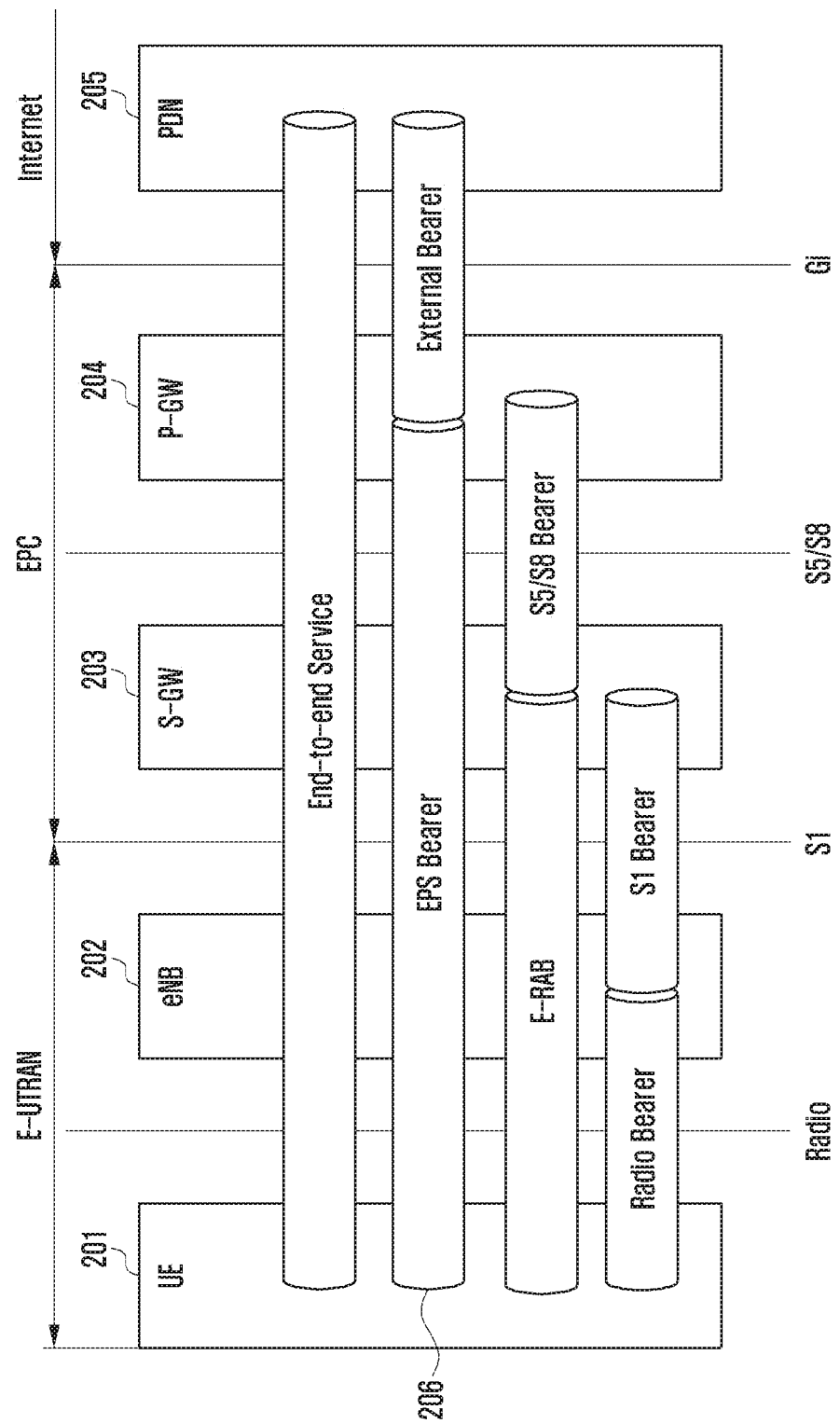
FIG. 2A and FIG. 2B illustrate data flow in an LTE base station (eNB) and an LTE system according to an embodiment of the disclosure.
Figure 2B:
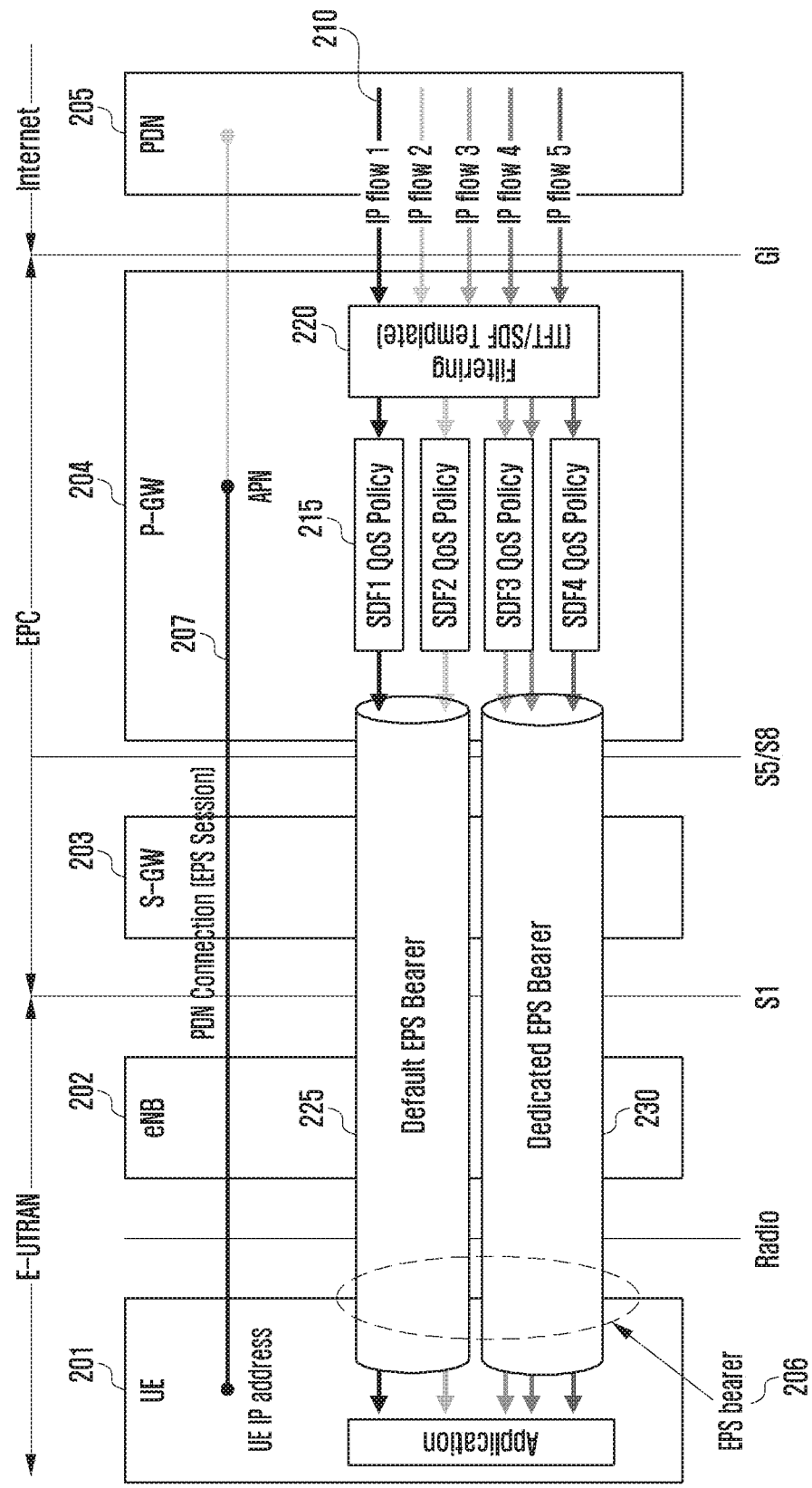

FIG. 2A and FIG. 2B illustrate data flow in an LTE base station (eNB) and an LTE system according to an embodiment of the disclosure. Hereinafter, FIG. 2A and FIG. 2B are referred to as FIG. 2.

In FIG. 2, an operator providing an LTE service needs to be able to provide services requiring different levels of quality of service (QoS) for subscribers having different service grades. To this end, the operator needs be able to recognize the service grade of a subscriber and a service type and to differentially allocate and manage radio resources for user IP traffic (IP traffic or IP flow) 210. Therefore, a network configures a user traffic transmission path or controls the IP flow 210 for each service according to QoS requirements. In an evolved packet system (EPS), the user traffic transmission path is an EPS bearer 206, and different EPS bearers are generated according to QoS. IP flows having the same QoS are mapped to a service data flow (SDF) 215, and the SDF 215 is a unit for applying QoS rules reflecting operator policies.

FIG. 2 illustrates a specific relationship between the EPS bearer 206 and the SDF 215. For the IP flow 210, the SDF 215 provides QoS corresponding to a service, and the EPS bearer 206 provides QoS between a UE 201 and the P-GW 204 in an EPS transfer network. When the SDF 215 is transmitted to a user via the EPS, the SDF 215 is mapped to an EPS bearer capable of providing suitable QoS according to the QoS rules installed in the P-GW 204 and is transmitted. IP flows have different QoS characteristics depending on which service (or application) is use. The SDF 215 applies a specific QoS policy to an IP flow or a group of IP flows, into which user traffic is filtered (classified) by service, according to the subscriber grade of the UE 201 and a used application. In FIG. 2, IP flows directed to the user are filtered (classified) into SDFs through an SDF template (classifier) 220 according to service characteristics, and each SDF is subjected to a QoS policy (e.g., bandwidth control) and is transferred to the user. In the EPS transfer network, since QoS is provided by the EPS bearer 206, each SDF is mapped to and transmitted via an EPS bearer that enables QoS requirements to be satisfied.

EPS bearer types include a default bearer 225 and a dedicated bearer 230. When the UE 201 accesses an LTE network, an IP address is allocated, and a packet data network (PDN) connection 207 is established at the same time as a default EPS bearer 225 is generated. A user uses a service (e.g., the Internet) through the default bearer 225. However, to use a service (e.g., VoD) that cannot properly be provided with QoS via the default bearer, a dedicated bearer 230 may be generated on demand. That is, the dedicated bearer 230 is configured with a different level of QoS from that of the bearer already configured. The UE 201 may access a plurality of access point names (APNs) 204, and one default EPS bearer 225 and a plurality of dedicated EPS bearers 230 may be configured per APN. The default bearer 225 is generated when the user initially access the network, is continuously maintained even when any service is not used in the middle, and then disappears when the user leaves the network. One default bearer 225 is generated per APN. An APN to which a default bearer is generated in initial access to a network and QoS to be applied to the generation are provisioned as user subscription information in an HSS. When the UE 201 initially accesses a network, an MME downloads user subscription information (default APN, EPS subscribed QoS profile) from the HSS and generates a default bearer 225 to a PDN 205 using the subscriber QoS profile.

In FIG. 2, downlink IP flows are transferred through the EPS bearer 206 and the SDF 215 when transferred to the user via the EPS. The user IP flows 210 arriving at the P-GW 204 via the PDN 205 are filtered into the SDF 215 through the SDF template. IP flow 1 is classified as SDF1, IP flow 2 is classified as SDF 2, IP flow 3 and IP flow 4 are classified as SDF 3, and IP flow 5 is classified as SDF 4. Each SDF is subjected to the QoS rules and is then mapped to an EPS bearer according to a traffic flow template (TFT) filtering rules. SDF 1 and SDF 2 are mapped to a default bearer 225, and SDF 3 and SDF 4 are mapped to a dedicated bearer 230. The SDF is transmitted to the UE 201 through the corresponding EPS bearer. The IP flows arriving at the UE 201 are transmitted to a corresponding application.

In the LTE network, a QoS parameter is defined based on a bearer. An EPS bearer QoS parameter is a bearer level QoS parameter. A bearer level is called an SDF aggregate level. An SDF aggregate refers to a group of SDFs belonging to the same EPS session and having the same QoS class identifier (QCI) and the same allocation and retention priority (ARP) value. A QCI and an ARP are basic QoS parameters applied to any EPS bearer. A QCI is an expression of standardizing different QoS characteristics as an integer value (1 to 9), and a standardized QoS characteristic is represented by a resource type, a priority, a packet delay budget, or a packet error loss rate. EPS bearers are classified into a guaranteed bit rate (GBR) bearer and a non-GBR bearer according to the QCI resource type. The default bearer 225 is always a non-GBR bearer, and the dedicated bearer 230 may be configured as a GBR bearer or a non-GBR bearer. A GBR bearer has a QCI, an ARP, a GBR (UL/DL), and an MBR (UL/DL) as QoS parameters. A non-GBR bearer has a QCI, an ARP, an APN-AMBR (UL/DL), and a UE-AMBR (UL/DL) as QoS parameters. In addition to a QCI and an ARP, a GBR bearer has a GBR and an MBR as QoS parameters, which means that each bearer is allocated a fixed resource (guaranteed bandwidth). A non-GBR bearer has an aggregated maximum bit rate (AMBR) as a QoS parameter, which means that a resource is not allocated per bearer but the maximum bandwidth that can be shared with other non-GBR bearers is allocated. An APN-AMBR is the maximum bandwidth that can be shared by non-GBR bearers in the same PDN, and a UE-AMBR is the maximum bandwidth that can be shared within the same UE. When a UE has a plurality of PDN connections, the sum of APN-AMBRs of respective PDNs cannot exceed the UE-AMBR.

Figure 3:
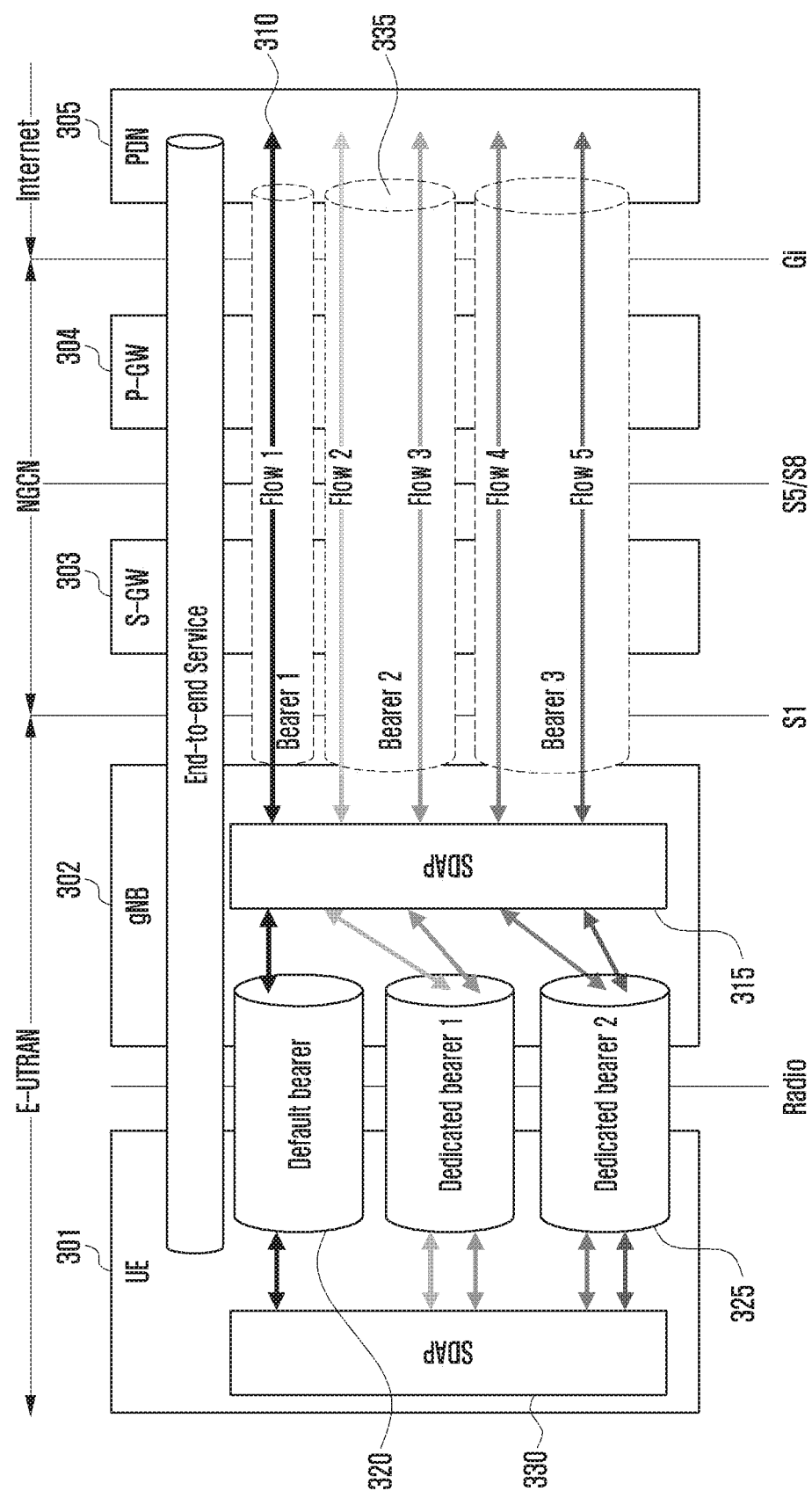
FIG. 3 illustrates data flow in a next-generation mobile communication system base station (gNB) and a next-generation mobile communication system according to an embodiment of the disclosure.

FIG. 3 illustrates data flow in a next-generation mobile communication system base station (gNB) and a next-generation mobile communication system according to an embodiment of the disclosure.

In the embodiment of the disclosure, a flow may refer to an IP flow or may refer to a service data flow (SDF). The SDF may be represented as a group of IP flows.

In FIG. 3, the concept of bearers 320 and 325 exists in an E-UTRAN as in FIG. 2, while the concept of a bearer 335 does not exist in a next-generation core network (NGCN). The NGCN may be an evolved CN from an EPC in an LTE system or a new CN. When downlink data is generated in a PDN, IP flows 310 are transferred to a base station (gNB) 302 through the PDN 305, a P-GW 304, and an S-GW 303. The base station (gNB) may be an evolved base station from an LTE base station or a new base station for a next-generation wireless communication system. A packet of the flows 310 may have a packet marking indicating QoS information. Alternatively, each flow may be mapped to specific QoS information. QoS refers to a capability or measurement to guarantee a certain level of performance in data transmission by prioritizing applications, users, or data flows. QoS may indicate the minimum transmission bit rate, a delay, a packet loss rate, or the like. Upon receiving the flows 310, the base station 302 may interpret the packet marking in the packet of the flows, thereby obtaining QoS information. Alternatively, the base station 302 may obtain QoS information about each of the flows based on pre-defined mapping information about the flows 310 and QoS information. The base station allocates the flows 310 to corresponding bearers according to the QoS information through a layer or a device of a service data association protocol (SDAP) 315. When there is no bearer corresponding to the QoS of a flow, the base station may newly configure a bearer corresponding to the QoS with a UE.

In FIG. 3, when uplink data is generated, the UE 301 checks whether a downlink flow corresponding to the data has been previously received. This checking process may be performed using header information of an IP packet, such as a source IP address and a destination IP address. When there is the flow corresponding to the uplink data among previously received downlink flows, the UE 301 may map the uplink data to the flow and transmits the uplink data to the base station 302 through a corresponding bearer. When there is no flow corresponding to the uplink data among the previously received downlink flows, the UE 301 may mark QoS information on the data packet through a layer or a device of an SDAP 330. QoS refers to a capability or measurement to guarantee a certain level of performance in data transmission by prioritizing applications, users, or data flows. QoS may indicate the minimum transmission bit rate, a delay, a packet loss rate, or the like. The SDAP layer or device of the UE checks whether there is a bearer suitable for the marked QoS information among the bearers 320 and 325 currently configured based on the marked QoS information. When there is a suitable bearer, the SDAP layer or device 315 of the UE maps the uplink flow to the bearer and transmits the same. If there is no suitable bearer, the SDAP layer or device 315 of the UE maps the uplink flow to a default bearer 320 and transmits the same. Upon receiving the uplink flow via the default bearer 320, the SDAP layer or the device 315 of the base station 302 may check a packet marking of the uplink flow to obtain the QoS information, and may configure a new bearer suitable for the QoS of the flow with the UE 301 when determining that the QoS of the flow is not suitable for the QoS of the default bearer. When the new bearer is configured, the UE 301 transmits an uplink flow subsequently generated through the newly configured bearer instead of the default bearer.

Figure 4:
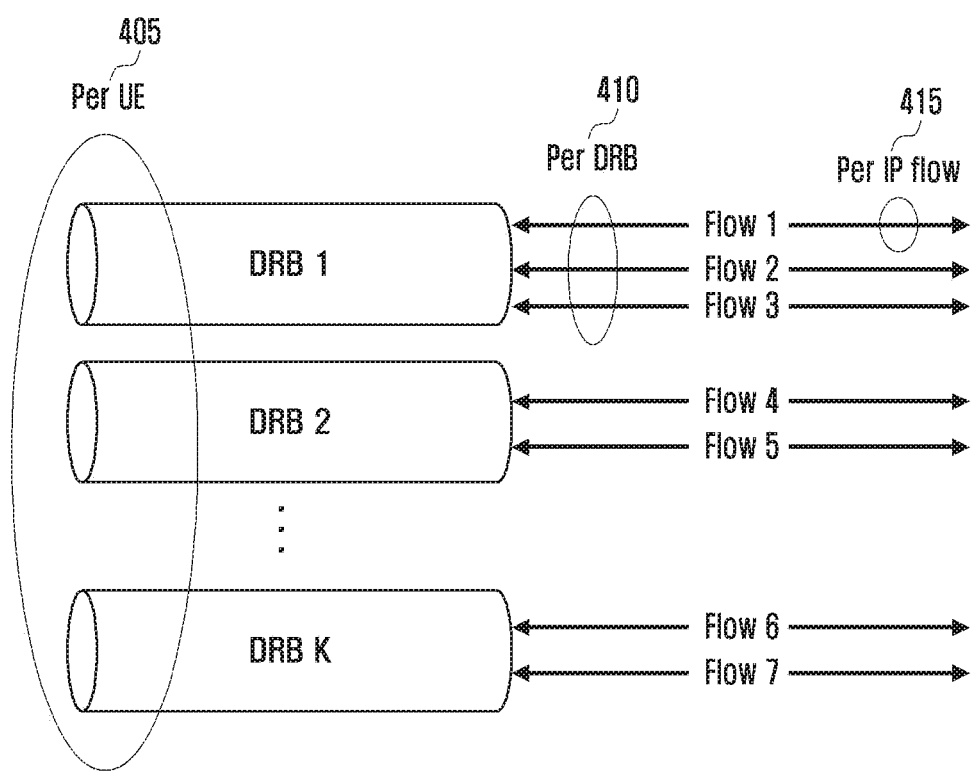
FIG. 4 illustrates a unit for a network apparatus (e.g., a base station, a router, a gateway (P-GW), or the like) to divide packets in a mobile communication system network according to an embodiment of the disclosure.

FIG. 4 illustrates a unit for a network apparatus (e.g., a base station, a router, a gateway (P-GW), or the like) to divide packets in a mobile communication system network according to an embodiment of the disclosure.

As illustrated in FIG. 4, flows of packets may be divided per UE based on a source IP address that a UE has, a UE identifier allocated by a base station, a bearer identifier, a QoS flow identifier, or an IP identifier. For example, packets may be divided per UE (user), such as data packets transmitted and received to UE 1 and data packets transmitted and received to UE 2.

According to a unit for further subdivision, packets are divided per bearer. Since a plurality of bearers may be configured for one UE, packets transmitted and received via each bearer may be divided per bearer. For example, packets may be divided per bearer for each UE, such as bearer 1 for UE 1, bearer 2 for UE 1, bearer 1 for UE 2, and bearer 2 for UE 2.

According to a unit for even further subdivision, data may be divided per QoS flow or IP flow. Since one bearer for one UE may be mapped to a plurality of IP flows, data may be divided per IP flow (or QoS flow). For example, data may be divided into data for IP flow 1 of bearer 1 for UE 1, data for IP flow 2 of bearer 1 for UE 1, data for IP flow 1 of bearer 2 for UE 1, data for IP flow 1 of bearer 1 for UE 2, and data for IP flow 2 of bearer 1 for UE 2.

The foregoing data packet processing units may be applied as units for processing data to determine the occurrence of congestion or to control congestion.

Figure 5:
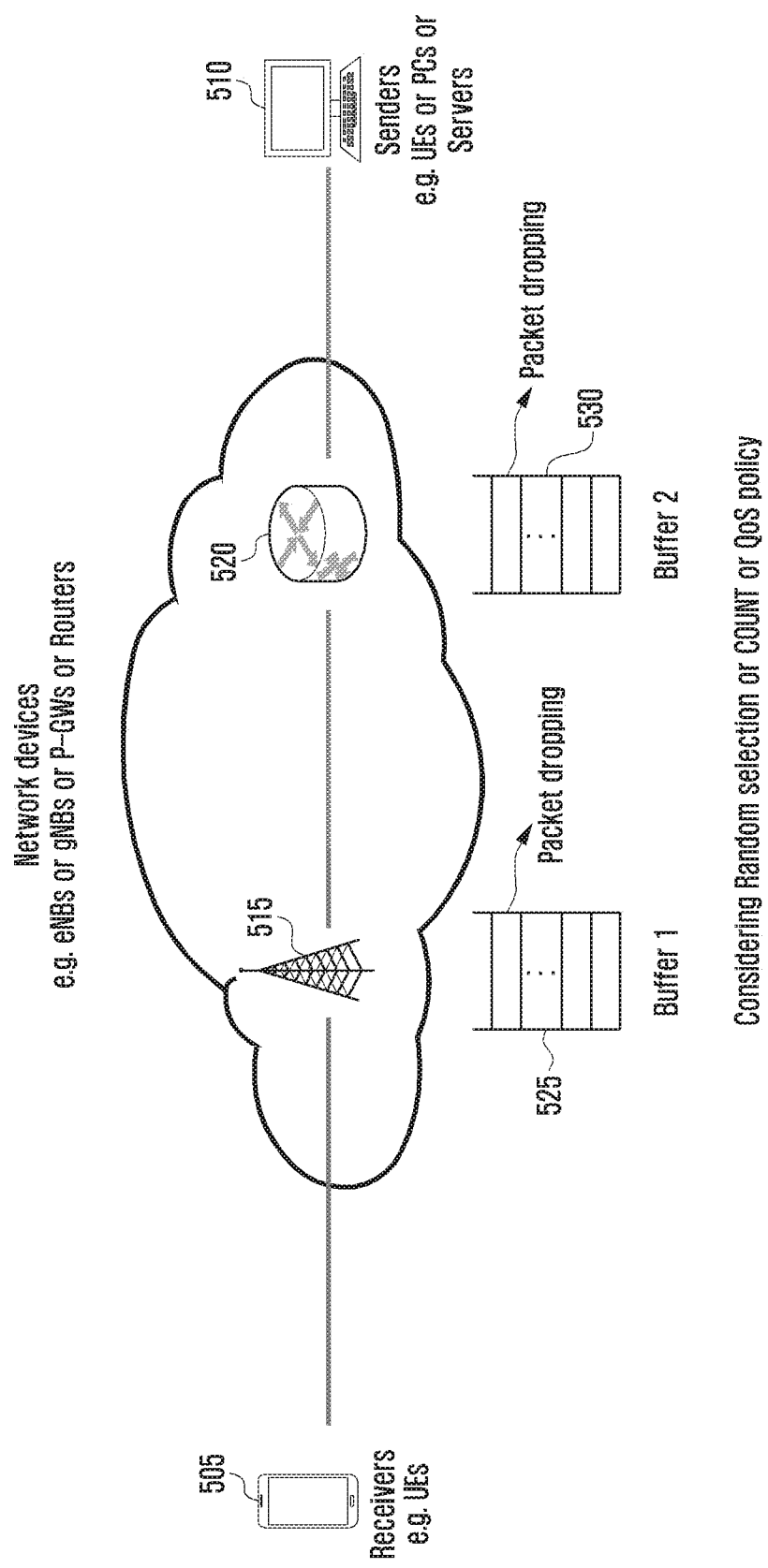
FIG. 5 illustrates embodiment 1 of controlling congestion in a mobile communication network according to the disclosure.

FIG. 5 illustrates embodiment 1 of controlling congestion in a mobile communication network according to the disclosure.

In FIG. 5, a plurality of UEs (users) 505 may access a base station 515 to transmit and receive data via a wireless network. The base stations 515 may be connected to a plurality of routers 520 and/or gateways (S-GW and P-GW) 520 to transmit and receive data through a wired network. The UEs 505 may exchange data with a plurality of other UEs, computers, or servers 510.

When the data is exchanged, congestion may occur in the wireless network or the wired network. It may be determined that congestion occurs when the amount of data waiting for transmission in a buffer of a network apparatus (e.g., the base station, the routers, the gateways, or other network apparatuses) reaches a certain criterion (525 and 530), that is, when the amount of the data exceeds the packet capacity of the network apparatus due to communication overload (congestion or delay).

In embodiment 1 of the disclosure, when congestion is detected by a method of detecting network communication congestion before the network communication congestion occurs to enable smooth communication, the network apparatus that detects the congestion discards a packet, thereby preventing overflow in the buffer. That is, when the amount of the data approaches a threshold value set by an administrator, the network apparatus selects a UE, a bearer, or a flow and discards packets corresponding thereto, thus enabling a transmitter to reduce a transmission speed. When the network apparatus discards the packets, a receiver may wait for a certain time, and may reduce data in the buffer for the difference between the waiting time of the receiver and the retransmission time of the transmitter as the transmitter requests retransmission.

In embodiment 1, when the network apparatus detects congestion and discards a packet, the following three methods may be employed to determine a packet to be discarded.

1. The network apparatus randomly selects a UE, a bearer, or an IP flow (or QoS flow) and discards data packets corresponding thereto.

2. The network apparatus may configure a counter for each UE, each bearer, or each IP flow (or QoS flow), may calculate the number or size of packets transmitted and received for each UE, each bearer, or each IP flow, and may detect data per UE, bearer, or IP flow that incurs congestion based on the counter values. Therefore, the network apparatus detects the cause of congestion by UE, bearer, or IP flow and discards data packets corresponding thereto (e.g., a higher counter value may indicate the cause of congestion). The counter may be periodically set to 0 according to a predetermined period to start calculation again.

3. The network apparatus may determine a data packet to be discarded per UE, each bearer, or each IP flow (or QoS flow) in view of a QoS policy set for each UE, each bearer, or each IP flow (or QoS flow).

Figure 6:
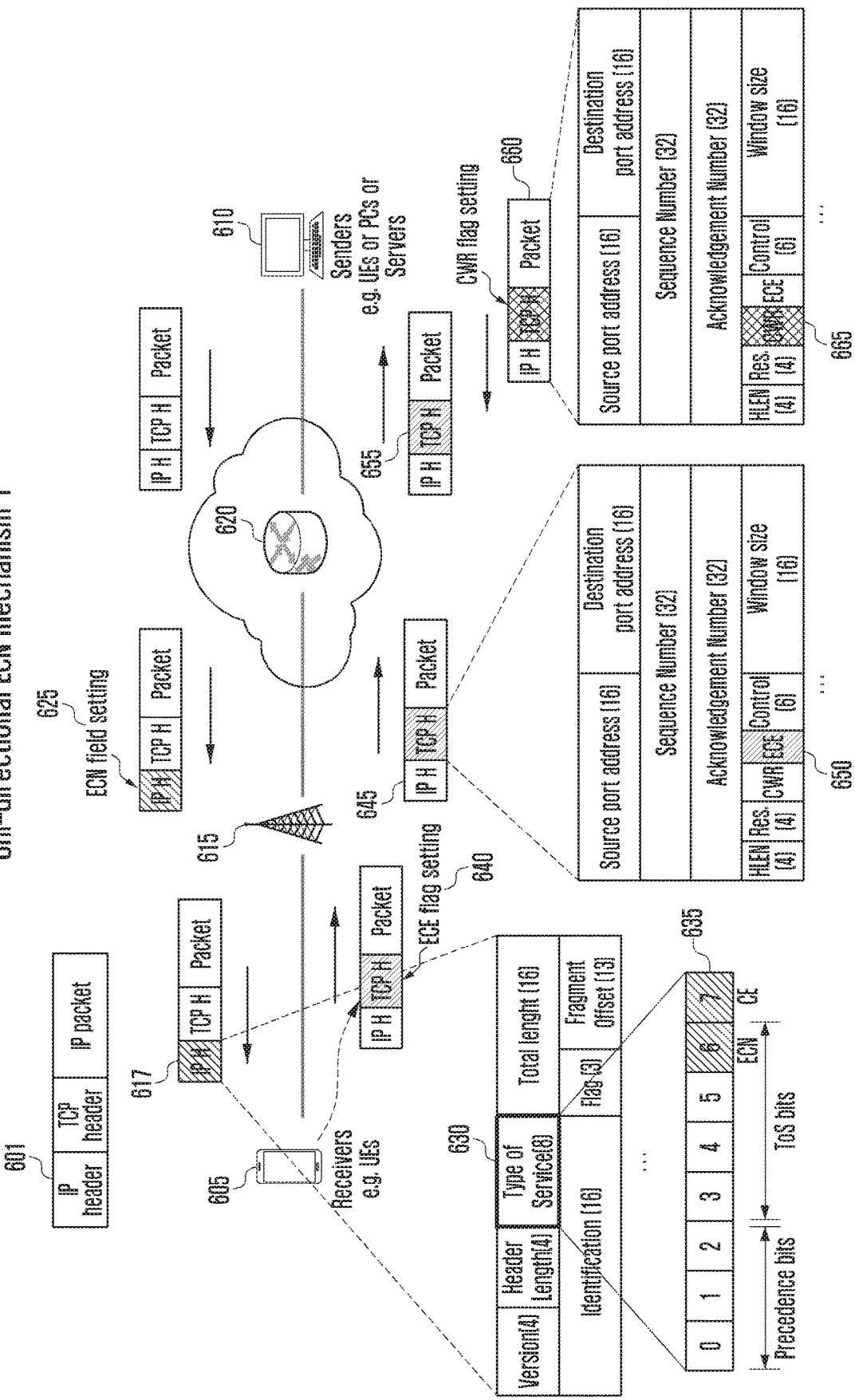
FIG. 6 illustrates embodiment 2 of controlling congestion in a mobile communication network according to the disclosure.

FIG. 6 illustrates embodiment 2 of controlling congestion in a mobile communication network according to the disclosure.

In FIG. 6, a plurality of UEs (users) 605 may access a base station 615 to transmit and receive data via a wireless network. The base stations 615 may be connected to a plurality of routers and/or gateways (S-GW and P-GW) 620 to transmit and receive data through a wired network. The UEs 605 may exchange data with a plurality of other UEs, computers, or servers 610.

When the data is exchanged, congestion may occur in the wireless network or the wired network. It may be determined that congestion occurs when the amount of data waiting for transmission in a buffer of a network apparatus (e.g., the base station, the routers, the gateways, or other network apparatuses) reaches a certain criterion, that is, when the amount of the data exceeds the packet capacity of the network apparatus due to communication overload (congestion or delay).

In embodiment 2 of the disclosure, even when congestion is not detected, the network apparatus (e.g., the base station, the routers, the gateways, or other network apparatuses) may always read and interpret an IP header or a transmission control protocol (TCP) header. Then, the network apparatus may perform the following procedure. When congestion is detected by a method of detecting network communication congestion before the network communication congestion occurs to enable smooth communication, the network apparatus (e.g., the base station, the routers, the gateways, or other network apparatuses 615 and 620) that detects the congestion selects a UE, a bearer, or an IP flow, checks an explicit congestion notification (ECN) field of an IP header of a packet corresponding to the selected one, determines that a congestion control notification (ECN) method according to embodiment 2 of the disclosure is supported if the ECN field has a value of 01 or 10, and notifies a receiver that congestion has occurred by setting an ECN-capable transport (ECT) flag and a congestion experience flag (CE) to 11 (617, 630, and 635). Upon receiving the packet, the receiver 605 sets an ECN-echo (ECE) flag of a TCP header of an uplink packet (e.g., a TCP ACK) corresponding to the packet (640, 645, and 650) and transmits the packet to a transmitter 610, thereby notifying the transmitter 610 that congestion has occurred. Then, the transmitter 610 recognizes that congestion has occurred and reduces a data transmission rate for transmission by reducing a window size. The transmitter 610 sets a congestion window reduced (CWR) flag of a TCP header of a packet to be transmitted and transmits the packet to the receiver 605 in order to notify the receiver 605 that the data transmission rate has been reduced and the ECE flag is successfully received (660 and 665). Upon receiving the packet with the set CWR flag of the TCP header, the receiver 605 may recognize that congestion control has been performed.

When receiving the packet in which the ECT flag and the CE flag of the ECN field of the IP header are set to 11, the receiver 605 may continue to set an ECN-echo (ECE) flag of a TCP header of an uplink packet (e.g., a TCP ACK) corresponding to the packet and to transmit the packet to a transmitter until receiving a packet with a CWR field of a TCP header set to 1 corresponding to the packet, thereby notifying the transmitter 610 that congestion has occurred, which is described in detail below.

The network apparatus that detects congestion sets the ECT flag and the CE flag of the IP header to 11 and transfers the ECT flag and the CE flag to the receiver 605. The CE bit is the last bit of the two-bit ECN field, and the ECN field may be set to 00, 01, 10, and 11, wherein 00 indicates that the ECN method is not used (a general case or a case where the transmitter and the receiver do not support ECN), and 01 or 10 represents ECN-capable transport (ECT), indicating that ECN is supported by the transmitter 610 and is thus available. The network apparatus equally regards 01 or 10 and may arbitrarily select and set any of 01 and 10. 11 indicates that congestion control has occurred. Therefore, when detecting device detects congestion, the network apparatus selects a UE, a bearer, or an IP flow, checks an ECN field of an IP header of a packet corresponding to the selected one, and transmits the ECT flag and the CE set to 11 to the receiver 605 if the ECN field is set to 01 or 10 and thus the ECN method can be performed. If the ECN field is set to 00 and thus the ECN method cannot be used, the network apparatus may select a packet corresponding to another UE, bearer, or IP flow and may repeat the same procedure.

TABLE

| ECN field | | |
|---|---|---|
| ECT bit | CE bit | Description |
| 0 | 0 | Not-ECT |
| 0 | 1 | ECT(1) |
| 1 | 0 | ECT(0) |
| 1 | 1 | CE |

The ECN field uses the last two bits present in a type of service (ToS) field of the IP header (630 and 635).

In embodiment 2, when the network apparatus detects congestion and sets an ECN field in an IP header of an IP packet to 11, the following three methods may be employed to determine a packet.

1. The network apparatus randomly selects a UE, a bearer, or an IP flow (or QoS flow), selects data packets corresponding thereto, and sets an ECN field to 11.

2. The network apparatus may configure a counter for each UE, each bearer, or each IP flow (or QoS flow), may calculate the number of packets transmitted and received for each UE, each bearer, or each IP flow, and may detect data per UE, bearer, or IP flow that incurs congestion based on the counter values. Therefore, the network apparatus detects the cause of congestion by UE, bearer, or IP flow, selects data packets corresponding thereto, and sets an ECN field to 11 (e.g., a higher counter value may indicate the cause of congestion). The counter may be periodically set to 0 according to a predetermined period to start calculation again.

3. The network apparatus selects data per UE, each bearer, or each IP flow (or QoS flow) in view of a QoS policy set for each UE, each bearer, or each IP flow (or QoS flow) and sets an ECN field to 11.

In the above procedure, when the network apparatus selects a packet and sets an ECN field to 11, if the ECN field is set to 00 and thus the ECN methods is not supported, the network apparatus may select another packet using one of the above three methods and may set an ECN field to 11.

Figure 7:
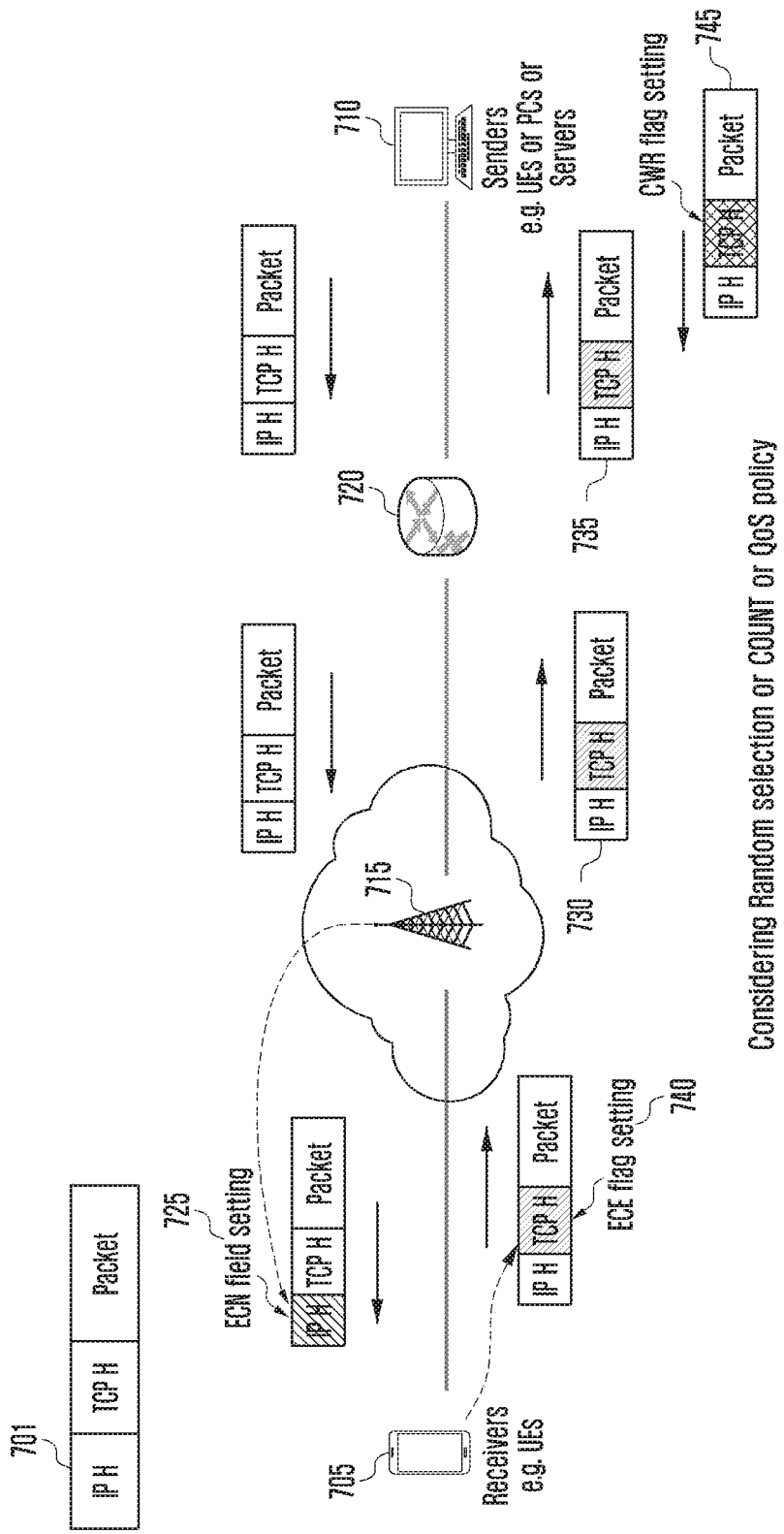
FIG. 7 illustrates embodiment 2-1 of controlling congestion in a mobile communication network according to the disclosure.

FIG. 7 illustrates embodiment 2-1 of controlling congestion in a mobile communication network according to the disclosure.

In FIG. 7, a plurality of UEs (users) 705 may access a base station 715 to transmit and receive data via a wireless network. The base stations 715 may be connected to a plurality of routers and/or gateways (S-GW and P-GW) 720 to transmit and receive data through a wired network. The UEs 705 may exchange data with a plurality of other UEs, computers, or servers 710.

When the data is exchanged, congestion may occur in the wireless network or the wired network. It may be determined that congestion occurs when the amount of data waiting for transmission in a buffer of a network apparatus (e.g., a base station, a router, a gateway, or other network apparatuses) reaches a certain criterion, that is, when the amount of the data exceeds the packet capacity of the network apparatus due to communication overload (congestion or delay).

In embodiment 2-1 of the disclosure, when congestion is not detected, the network apparatus (e.g., the base station, the routers, the gateways, or other network apparatuses) does not interpret an IP header or a TCP header when not needing to read and interpret an IP header or a TCP header. For example, the base station does not need to read an IP header and a TCP header. Therefore, only when congestion is detected, the network apparatus may read an IP header and a TCP header and may perform the following procedure.

When congestion is detected by a method of detecting network communication congestion before the network communication congestion occurs to enable smooth communication, the network apparatus (e.g., the base station, the routers, the gateways, or other network apparatuses 615 and 620) that detects the congestion selects a UE, a bearer, or an IP flow, checks an explicit congestion notification (ECN) field of an IP header of a packet corresponding to the selected one, determines that a congestion control notification (ECN) method according to embodiment 2 of the disclosure is supported if the ECN field has a value of 01 or 10, and notifies a receiver that congestion has occurred by setting an ECN-capable transport (ECT) flag and a congestion experience (CE) flag to 11 (625). Upon receiving the packet, the receiver sets an ECN-echo (ECE) flag of a TCP header of an uplink packet (e.g., a TCP ACK) corresponding to the packet (640) and transmits the packet to a transmitter, thereby notifying the transmitter that congestion has occurred. Then, the transmitter recognizes that congestion has occurred and reduces a data transmission rate for transmission by reducing a window size. The transmitter sets a congestion window reduced (CWR) flag of a TCP header of a packet to be transmitted and transmits the packet to the receiver in order to notify the receiver that the data transmission rate has been reduced and the ECE flag is successfully received (645). Upon receiving the packet with the set CWR flag of the TCP header, the receiver may recognize that congestion control has been performed.

When receiving the packet in which the ECT flag and the CE flag of the ECN field of the IP header are set to 11, the receiver may continue to set an ECN-echo (ECE) flag of a TCP header of an uplink packet (e.g., a TCP ACK) corresponding to the packet and to transmit the packet to a transmitter until receiving a packet with a CWR field of a TCP header set to 1 corresponding to the packet, thereby notifying the transmitter that congestion has occurred.

The network apparatus that detects congestion sets the ECT flag and the CE flag of the IP header to 11 and transfers the ECT flag and the CE flag to the receiver. The CE bit is the last bit of the two-bit ECN field, and the ECN field may be set to 00, 01, 10, and 11, wherein 00 indicates that the ECN method is not used (a general case or a case where the transmitter and the receiver do not support ECN), and 01 or 10 represents ECN-capable transport (ECT), indicating that ECN is supported by the transmitter and is thus available. The network apparatus equally regards 01 or 10 and may arbitrarily select and set any of 01 and 10. 11 indicates that congestion control has occurred. Therefore, when detecting device detects congestion, the network apparatus selects a UE, a bearer, or an IP flow, checks an ECN field of an IP header of a packet corresponding to the selected one, and transmits the ECT flag and the CE set to 11 to the receiver if the ECN field is set to 01 or 10 and thus the ECN method can be performed. If the ECN field is set to 00 and thus the ECN method cannot be used, the network apparatus may select a packet corresponding to another UE, bearer, or IP flow and may repeat the same procedure. The structure of the ECN field is illustrated in Table 1.

The ECN field uses the last two bits present in a type of service (ToS) field of the IP header (730 and 735).

In embodiment 2-1, when the network apparatus detects congestion and sets an ECN field in an IP header of an IP packet to 11, the following three methods may be employed to determine a packet.

1. The network apparatus randomly selects a UE, a bearer, or an IP flow (or QoS flow), selects data packets corresponding thereto, and sets an ECN field to 11.

2. The network apparatus may configure a counter for each UE, each bearer, or each IP flow (or QoS flow), may calculate the number of packets transmitted and received for each UE, each bearer, or each IP flow, and may detect data per UE, bearer, or IP flow that incurs congestion based on the counter values. Therefore, the network apparatus detects the cause of congestion by UE, bearer, or IP flow, selects data packets corresponding thereto, and sets an ECN field to 11 (e.g., a higher counter value may indicate the cause of congestion). The counter may be periodically set to 0 according to a predetermined period to start calculation again.

3. The network apparatus selects data per UE, each bearer, or each IP flow (or QoS flow) in view of a QoS policy set for each UE, each bearer, or each IP flow (or QoS flow) and sets an ECN field to 11.

In the above procedure, when the network apparatus selects a packet and sets an ECN field to 11, if the ECN field is set to 00 and thus the ECN methods is not supported, the network apparatus may select another packet using one of the above three methods and may set an ECN field to 11.

Figure 8B:
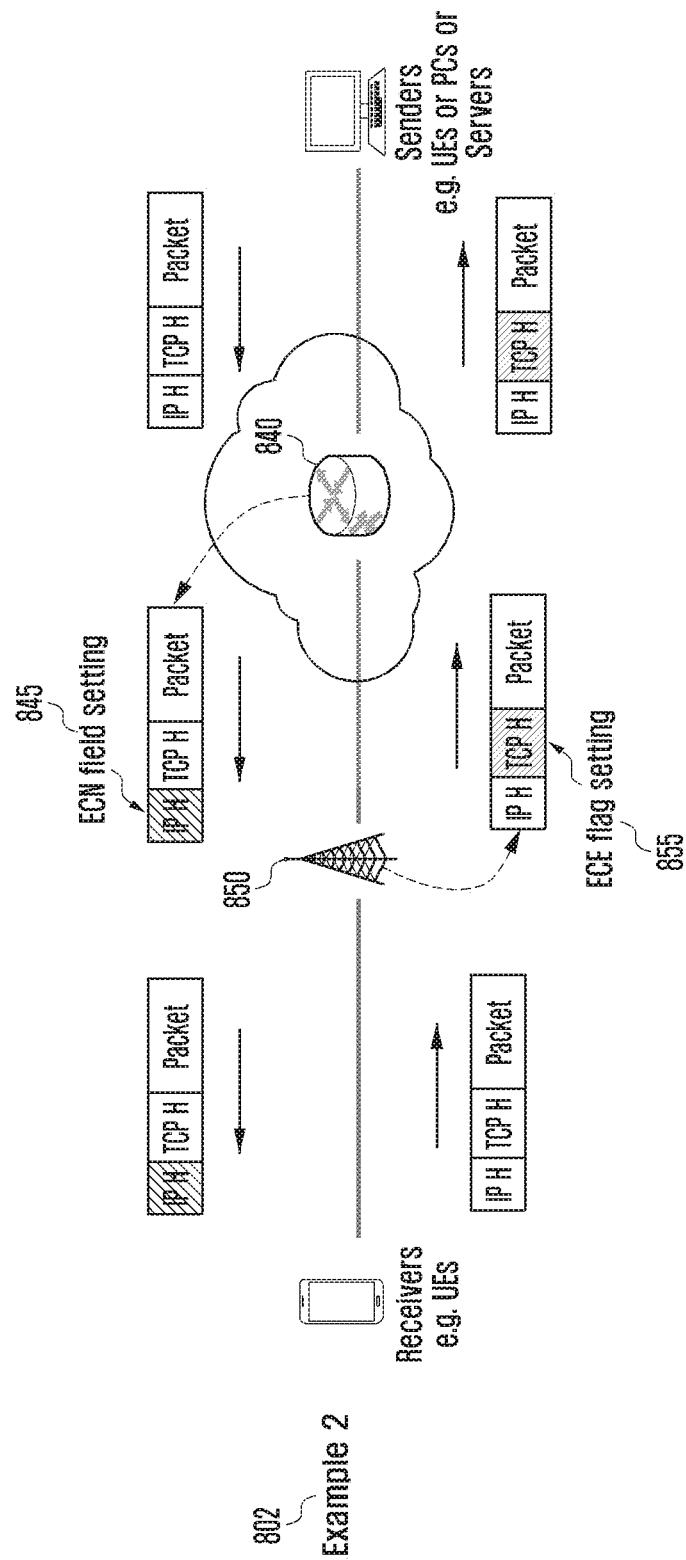
Figure 8C:
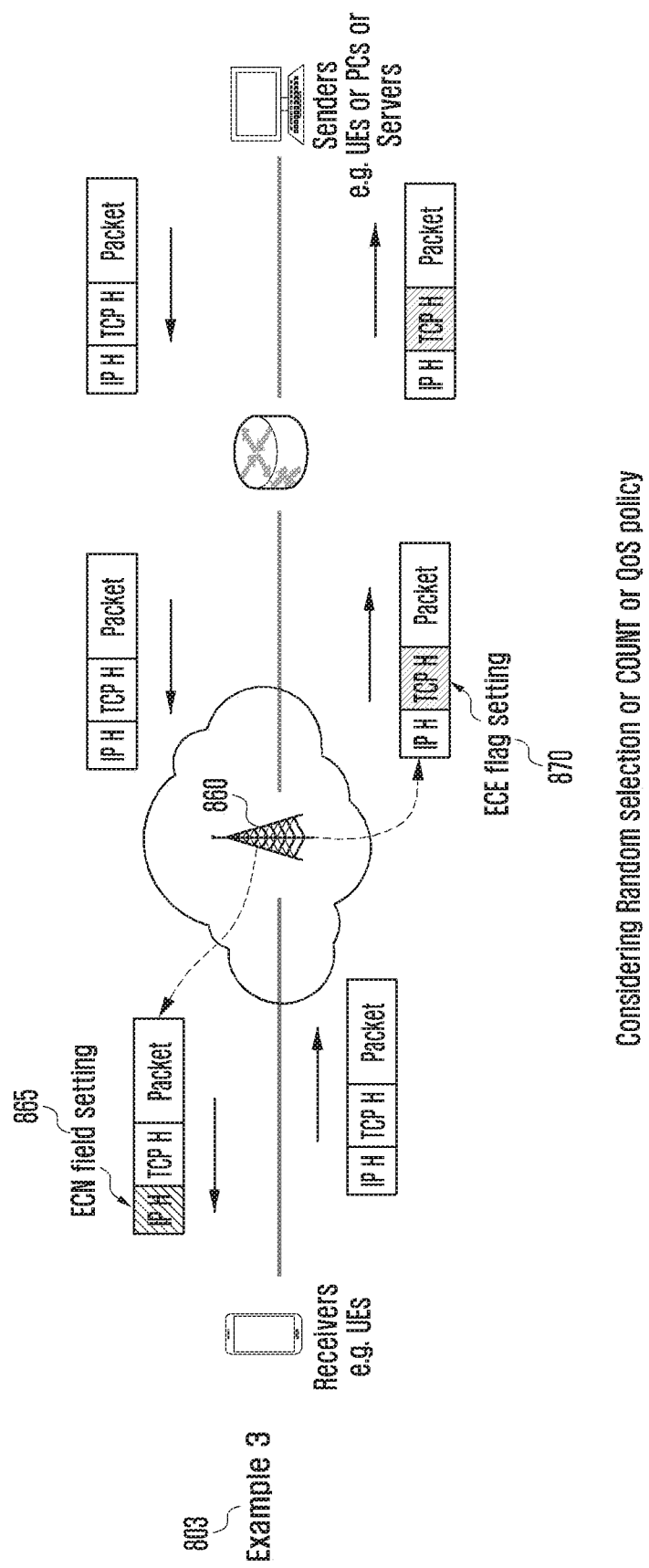

FIGS. 8A, 8B, and 8C illustrate embodiment 2-2 of controlling congestion in a mobile communication network according to the disclosure. Hereinafter, FIG. 8A, 8B, and FIG. 8C are referred to as FIG. 8.

In FIG. 8, a plurality of UEs (users) 805 may access a base station 815 to transmit and receive data via a wireless network. The base stations 815 may be connected to a plurality of routers and/or gateways (S-GW and P-GW) 820 to transmit and receive data through a wired network. The UEs 805 may exchange data with a plurality of other UEs, computers, or servers 810.

When the data is exchanged, congestion may occur in the wireless network or the wired network. It may be determined that congestion occurs when the amount of data waiting for transmission in a buffer of a network apparatus (e.g., a base station, a router, a gateway, or other network apparatuses) reaches a certain criterion, that is, when the amount of the data exceeds the packet capacity of the network apparatus due to communication overload (congestion or delay).

In embodiment 2-2 of the disclosure, even when congestion is not detected, the network apparatus (e.g., the base station, the routers, the gateways, or other network apparatuses) may continuously read and interpret an IP header or a TCP header.

When congestion is detected by a method of detecting network communication congestion before the network communication congestion occurs to enable smooth communication, the network apparatus (e.g., the base station, the routers, the gateways, or other network apparatuses 815 and 820) that detects the congestion selects a UE, a bearer, or an IP flow, checks an explicit congestion notification (ECN) field of an IP header of a packet corresponding to the selected one, determines that a congestion control notification (ECN) method according to embodiment 2 of the disclosure is supported if the ECN field has a value of 01 or 10, and notifies a receiver that congestion has occurred by setting an ECN-capable transport (ECT) flag and a congestion experience (CE) flag to 11 (825, 845, and 865). The network apparatus may set an ECN-echo (ECE) flag of a TCP header of a packet corresponding to a UE, a bearer, or an IP flow (830, 855, and 870) not only in a receiver direction but also in the opposite direction, which is a transmitter direction, and may transmit the packet to a transmitter. Upon receiving the packet, the receiver sets an ECN-echo (ECE) flag of a TCP header of an uplink packet (e.g., a TCP ACK) corresponding to the packet and transmits the packet to the transmitter, thereby notifying the transmitter that congestion has occurred. Then, the transmitter recognizes that congestion has occurred and reduces a data transmission rate for transmission by reducing a window size. The transmitter sets a congestion window reduced (CWR) flag of a TCP header of a packet to be transmitted and transmits the packet to the receiver in order to notify the receiver that the data transmission rate has been reduced and the ECE flag is successfully received. Upon receiving the packet with the set CWR flag of the TCP header, the receiver may recognize that congestion control has been performed.

When receiving the packet in which the ECT flag and the CE flag of the ECN field of the IP header are set to 11, the receiver may continue to set an ECN-echo (ECE) flag of a TCP header of an uplink packet (e.g., a TCP ACK) corresponding to the packet and to transmit the packet to a transmitter until receiving a packet with a CWR field of a TCP header set to 1 corresponding to the packet, thereby notifying the transmitter that congestion has occurred, which is described in detail below.

Example 1 801 of FIG. 8 is illustrated.

When the network apparatus (the routers, the S-GW, or the P-GW 820) detects congestion, the network apparatus may perform one of the following operations.

1. The network apparatus selects a UE, a bearer, or an IP flow, sets an ECT flag and a CE flag of an IP header to 11, and transmits the same to the receiver. At the same time, the network apparatus checks and discovers a packet corresponding to the selected UE, bearer, or IP flow and being transmitted via an uplink (which can be performed by checking the IP header and a TCP header), sets an ECE flag of the TCP header, and transmits the same to the transmitter.

2. The network apparatus selects a UE, a bearer, or an IP flow, sets an ECT flag and a CE flag of an IP header to 11, and transmits the same to the receiver. At the same time, the network apparatus selects a new UE, bearer, or IP flow for data being transmitted via an uplink regardless of the selected UE, bearer, or IP flow, sets an ECE flag of a TCP header of a packet being transmitted via the uplink, and transmits the same to the transmitter.

3. The network apparatus selects a UE, bearer, or IP flow for data being transmitted via an uplink, sets an ECE flag of a TCP header, and transmits the same to the transmitter. At the same time, the network apparatus checks and discovers a packet corresponding to the selected UE, bearer, or IP flow and being transmitted via a downlink (which can be performed by checking an IP header and the TCP header), sets an ECT flag and a CE flag of the IP header to 11, and transmits the same to the receiver.

4. The network apparatus selects a UE, bearer, or IP flow for data being transmitted via an uplink, sets an ECE flag of a TCP header, and transmits the same to the transmitter. At the same time, the network apparatus selects a new UE, bearer, or IP flow for data being transmitted via a downlink regardless of the selected UE, bearer, or IP flow, sets an ECT flag and a CE flag of the IP header to 11, and transmits the same to the receiver.

5. The network apparatus selects a UE, bearer, or IP flow for data being transmitted via an uplink, sets an ECE flag of a TCP header, and transmits the same to the transmitter. That is, the network apparatus performs transmission only to the transmitter.

Example 2 802 of FIG. 8 is illustrated.

In example 2, when the network apparatus (e.g., the base station 850) continuously reads an IP header and identifies that an ECN field of an IP header is set to 11, the network apparatus may perform one of the following operations.

1. The network apparatus checks and discovers a packet corresponding to a read packet and being transmitted via an uplink (which can be performed by checking the IP header and a TCP header), sets an ECE flag of the TCP header, and transmits the same to the transmitter.

2. The network apparatus selects a new UE, bearer, or IP flow for data being transmitted via an uplink regardless of data corresponding to the read IP header, sets an ECE flag of a TCP header, sets an ECE flag of a TCP header of a packet being transmitted via the uplink, and transmits the same to the transmitter.

Example 3 803 of FIG. 8 is illustrated.

When the network apparatus (e.g., the base station 860) detects congestion, the network apparatus may perform one of the following operations.

1. The network apparatus selects a UE, a bearer, or an IP flow, sets an ECT flag and a CE flag of an IP header to 11, and transmits the same to the receiver. At the same time, the network apparatus checks and discovers a packet corresponding to the selected UE, bearer, or IP flow and being transmitted via an uplink (which can be performed by checking the IP header and a TCP header), sets an ECE flag of the TCP header, and transmits the same to the transmitter.

2. The network apparatus selects a UE, a bearer, or an IP flow, sets an ECT flag and a CE flag of an IP header to 11, and transmits the same to the receiver. At the same time, the network apparatus selects a new UE, bearer, or IP flow for data being transmitted via an uplink regardless of the selected UE, bearer, or IP flow, sets an ECE flag of a TCP header of a packet being transmitted via the uplink, and transmits the same to the transmitter.

3. The network apparatus selects a UE, bearer, or IP flow for data being transmitted via an uplink, sets an ECE flag of a TCP header, and transmits the same to the transmitter. At the same time, the network apparatus checks and discovers a packet corresponding to the selected UE, bearer, or IP flow and being transmitted via a downlink (which can be performed by checking an IP header and the TCP header), sets an ECT flag and a CE flag of the IP header to 11, and transmits the same to the receiver.

4. The network apparatus selects a UE, bearer, or IP flow for data being transmitted via an uplink, sets an ECE flag of a TCP header, and transmits the same to the transmitter. At the same time, the network apparatus selects a new UE, bearer, or IP flow for data being transmitted via a downlink regardless of the selected UE, bearer, or IP flow, sets an ECT flag and a CE flag of the IP header to 11, and transmits the same to the receiver.

5. The network apparatus selects a UE, bearer, or IP flow for data being transmitted via an uplink, sets an ECE flag of a TCP header, and transmits the same to the transmitter. That is, the network apparatus performs transmission only to the transmitter.

In embodiment 2-2, when the network apparatus detects congestion and sets an ECN field in an IP header of an IP packet to 11 or sets an ECE flag of a TCP header of the IP packet, the following three methods may be employed to determine a packet.

1. The network apparatus randomly selects a UE, a bearer, or an IP flow (or QoS flow), selects data packets corresponding thereto, and sets an ECN field to 11 or sets an ECE flag of a TCP header of an IP packet.

2. The network apparatus may configure a counter for each UE, each bearer, or each IP flow (or QoS flow), may calculate the number of packets transmitted and received for each UE, each bearer, or each IP flow, and may detect data per UE, bearer, or IP flow that incurs congestion based on the counter values. Therefore, the network apparatus detects the cause of congestion by UE, bearer, or IP flow, selects data packets corresponding thereto, and sets an ECN field to 11 or sets an ECE flag of a TCP header of an IP packet (e.g., a higher counter value may indicate the cause of congestion). The counter may be periodically set to 0 according to a predetermined period to start calculation again.

3. The network apparatus selects data per UE, each bearer, or each IP flow (or QoS flow) in view of a QoS policy set for each UE, each bearer, or each IP flow (or QoS flow) and sets an ECN field to 11 or sets an ECE flag of a TCP header of an IP packet.

Among the embodiments of the disclosure, embodiment 2-3 of controlling congestion in the mobile communication network is mostly the same as embodiment 2-2. However, in embodiment 2-2, when congestion is not detected, the network apparatus (e.g., the base station, the routers, the gateways, or other network apparatuses) does not need to read and interpret an IP header and a TCP header if not needing to read and interpret an IP header and a TCP header. For example, the base station does not need to read an IP header and a TCP header. Therefore, the procedure of example 2 802 of embodiment 2-2 cannot be performed. Instead, processing loads of reading an unnecessary IP header and TCP header can be reduced.

The embodiments proposed in the disclosure may be used by applying a plurality of embodiments at a time. That is, the plurality of embodiments may be applied to a base station, a router, or a gateway at the same time.

Figure 9:
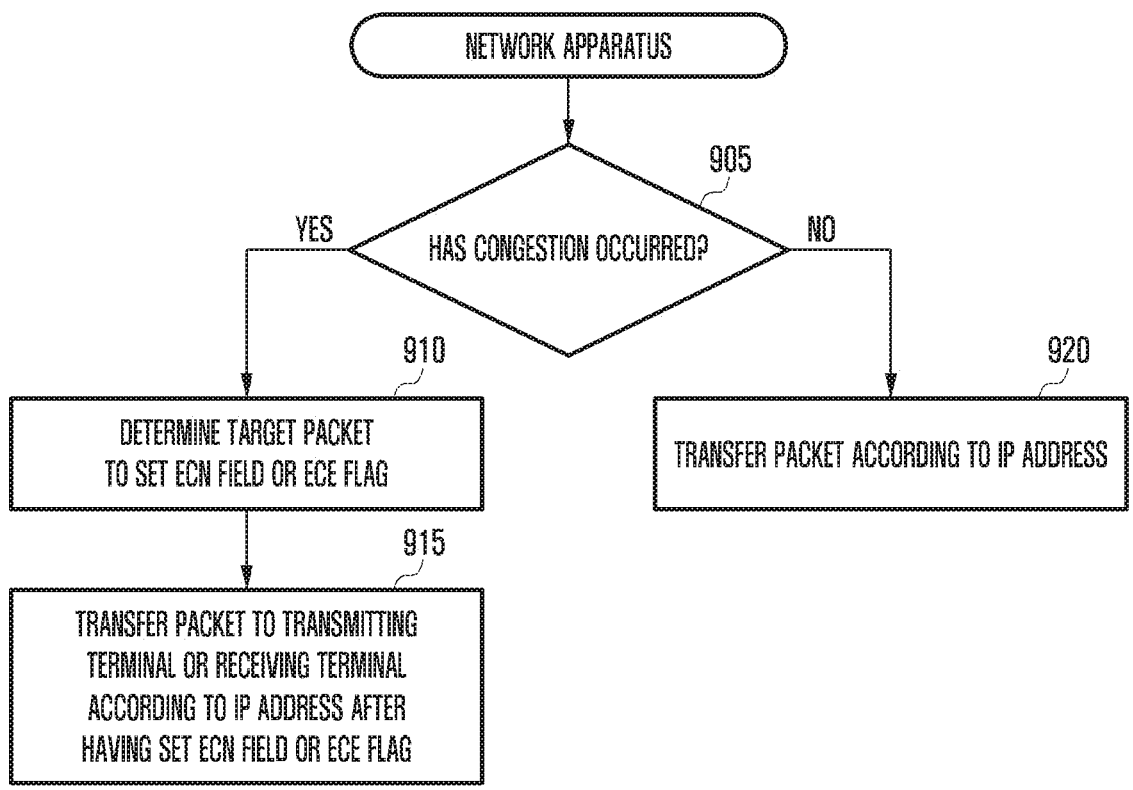
FIG. 9 illustrates an operation of a network apparatus according to an embodiment of the disclosure.

FIG. 9 illustrates an operation of a network apparatus according to an embodiment of the disclosure.

In FIG. 9, the network apparatus may detect whether congestion occurs. It may be determined whether congestion occurs by checking the buffer state of the network apparatus. Alternatively, it may be determined that congestion has occurred when identifying that an ECN field of an IP header field of a received packet is set to 11 (905).

When it is determined that congestion has occurred, the network apparatus determines a packet to set an ECN field of an IP header or an ECE flag of a TCP header in according to one of the following three methods (910).

1. The network apparatus randomly selects a UE, a bearer, or an IP flow (or QoS flow), selects data packets corresponding thereto, and sets an ECN field to 11 or sets an ECE flag of a TCP header of an IP packet.

2. The network apparatus may configure a counter for each UE, each bearer, or each IP flow (or QoS flow), may calculate the number of packets transmitted and received for each UE, each bearer, or each IP flow, and may detect data per UE, bearer, or IP flow that incurs congestion based on the counter values. Therefore, the network apparatus detects the cause of congestion by UE, bearer, or IP flow, selects data packets corresponding thereto, and sets an ECN field to 11 or sets an ECE flag of a TCP header of an IP packet (e.g., a higher counter value may indicate the cause of congestion). The counter may be periodically set to 0 according to a predetermined period to start calculation again.

3. The network apparatus selects data per UE, each bearer, or each IP flow (or QoS flow) in view of a QoS policy set for each UE, each bearer, or each IP flow (or QoS flow) and sets an ECN field to 11 or sets an ECE flag of a TCP header of an IP packet.

The network apparatus may select a packet according to an applied embodiment among embodiment 2-1, embodiment 2-2, or embodiment 2-3 proposed above, may set an ECN field to 11 or may set an ECE flag of a TCP header of an IP packet, and may transmit the packet according to the IP address (915). If no congestion has occurred, the packet is forwarded according to the IP address (920).

Figure 10:
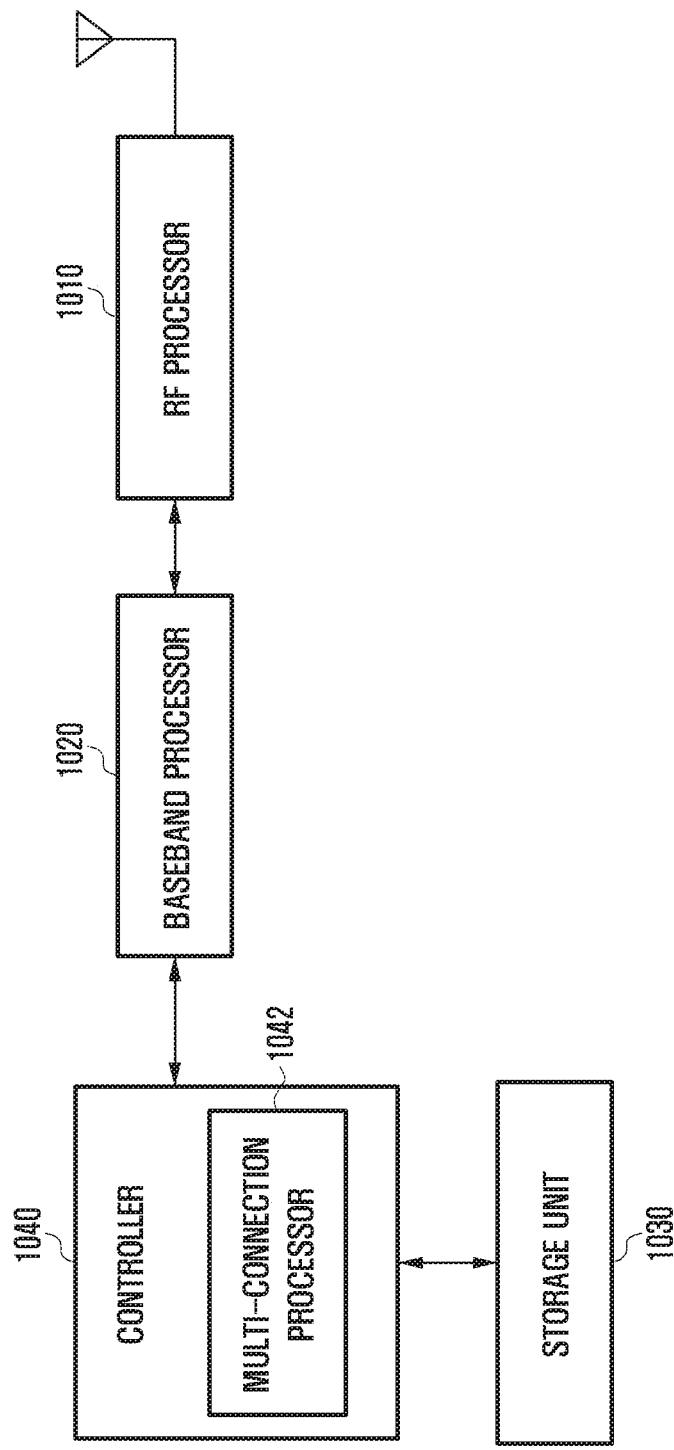
FIG. 10 illustrates the configuration of a UE according to an embodiment of the disclosure.

FIG. 10 illustrates the configuration of a UE according to an embodiment of the disclosure.

Referring to FIG. 10, the UE includes a radio frequency (RF) processor 1010, a baseband processor 1020, a storage unit 1030, and a controller 1040. The controller 1040 may further include a multi-connection processor 1042.

The RF processor 1010 performs a function for transmitting or receiving a signal through a wireless channel, such as band conversion and amplification of a signal. That is, the RF processor 1010 upconverts a baseband signal, provided from the baseband processor 1020, into an RF band signal to transmit the RF band signal through an antenna and downconverts an RF band signal, received through the antenna, into a baseband signal. For example, the RF processor 1010 may include a transmission filter, a reception filter, an amplifier, a mixer, an oscillator, a digital-to-analog converter (DAC), and an analog-to-digital converter (ADC). Although FIG. 10 shows only one antenna, the UE may include a plurality of antennas. In addition, the RF processor 1010 may include a plurality of RF chains. Further, the RF processor 1010 may perform beamforming. For beamforming, the RF processor 1010 may adjust the phase and strength of each of signals transmitted and received through a plurality of antennas or antenna elements. The RF processor may perform MIMO and may receive a plurality of layers when performing MIMO. The RF processor 1010 may perform reception beam sweeping by appropriately setting the plurality of antennas or antenna elements under the control of the controller, or may adjust the orientation and width of a reception beam such that the reception beam is coordinated with a transmission beam.

The baseband processor 1020 performs a function of converting a baseband signal and a bit stream according to the physical-layer specification of a system. For example, in data transmission, the baseband processor 1020 encodes and modulates a transmission bit stream, thereby generating complex symbols. In data reception, the baseband processor 1020 demodulates and decodes a baseband signal, provided from the RF processor 1010, thereby reconstructing a reception bit stream. For example, according to OFDM, in data transmission, the baseband processor 1020 generates complex symbols by encoding and modulating a transmission bit stream, maps the complex symbols to subcarriers, and constructs OFDM symbols through an inverse fast Fourier transform (IFFT) and cyclic prefix (CP) insertion. In data reception, the baseband processor 1020 divides a baseband signal, provided from the RF processor 1010, into OFDM symbols, reconstructs signals mapped to subcarriers through a fast Fourier transform (FFT), and reconstructs a reception bit stream through demodulation and decoding.

As described above, the baseband processor 1020 and the RF processor 1010 transmit and receive signals. Accordingly, the baseband processor 1020 and the RF processor 1010 may be referred to as a transmitter, a receiver, a transceiver, or a communication unit. At least one of the baseband processor 1020 and the RF processor 1010 may include a plurality of communication modules to support a plurality of different radio access technologies. Further, at least one of the baseband processor 1020 and the RF processor 1010 may include different communication modules for processing signals in different frequency bands. For example, the different radio access technologies may include an LTE network, an NR network, and the like. In addition, the different frequency bands may include a super high frequency (SHF) band (e.g., 2.5 GHz or 5 GHz) and a millimeter wave band (e.g., 60 GHz).

The storage unit 1030 stores data, such as a default program, an application, and configuration information for operating the UE. The storage unit 1030 provides stored data upon request from the controller 1040.

The controller 1040 controls overall operations of the UE. For example, the controller 1040 transmits and receives signals through the baseband processor 1020 and the RF processor 1010. Further, the controller 1040 records and reads data in the storage unit 1040. To this end, the controller 1040 may include at least one processor. For example, the controller 1040 may include a communication processor (CP) to perform control for communication and an application processor (AP) to control an upper layer, such as an application.

Figure 11:
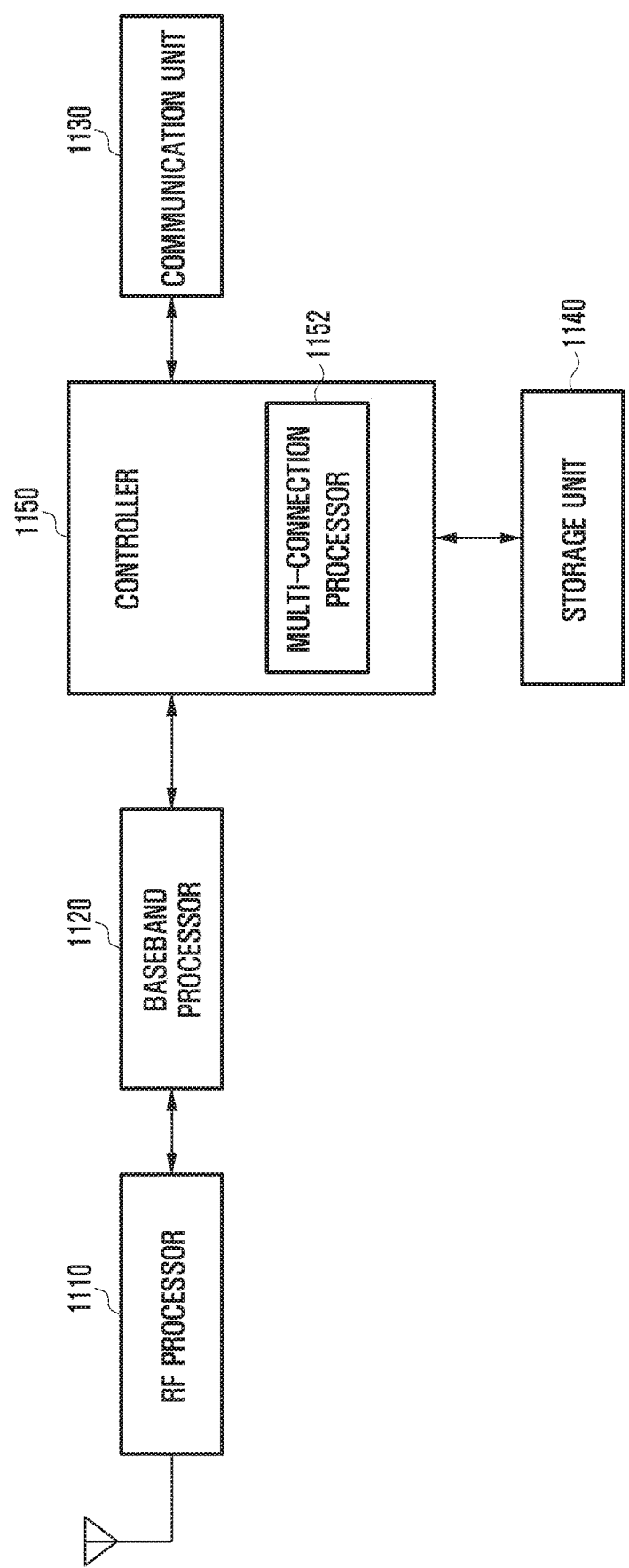
FIG. 11 illustrates the configuration of a base station in a wireless communication system according to an embodiment of the disclosure.

FIG. 11 illustrates the configuration of a base station in a wireless communication system according to an embodiment of the disclosure.

Referring to FIG. 11, the base station includes an RF processor 1110, a baseband processor 1120, a backhaul communication unit 1130, a storage unit 1140, and a controller 1150.

The RF processor 1110 performs a function for transmitting or receiving a signal through a wireless channel, such as band conversion and amplification of a signal. That is, the RF processor 1110 upconverts a baseband signal, provided from the baseband processor 1120, into an RF band signal to transmit the RF band signal through an antenna and downconverts an RF band signal, received through the antenna, into a baseband signal. For example, the RF processor 1110 may include a transmission filter, a reception filter, an amplifier, a mixer, an oscillator, a DAC, and an ADC. Although FIG. 1Q shows only one antenna, the first access node may include a plurality of antennas. In addition, the RF processor 1110 may include a plurality of RF chains. Further, the RF processor 1110 may perform beamforming. For beamforming, the RF processor 1110 may adjust the phase and strength of each of signals transmitted and received through a plurality of antennas or antenna elements. The RF processor may transmit one or more layers, thereby performing downlink MIMO.

The baseband processor 1120 performs a function of converting a baseband signal and a bit stream according to the physical-layer specification of a first radio access technology. For example, in data transmission, the baseband processor 1120 encodes and modulates a transmission bit stream, thereby generating complex symbols. In data reception, the baseband processor 1120 demodulates and decodes a baseband signal, provided from the RF processor 1110, thereby reconstructing a reception bit stream. For example, according to OFDM, in data transmission, the baseband processor 1120 generates complex symbols by encoding and modulating a transmission bit stream, maps the complex symbols to subcarriers, and constructs OFDM symbols through an IFFT and CP insertion. In data reception, the baseband processor 1120 divides a baseband signal, provided from the RF processor 1110, into OFDM symbols, reconstructs signals mapped to subcarriers through an FFT, and reconstructs a reception bit stream through demodulation and decoding. As described above, the baseband processor 1120 and the RF processor 1110 transmit and receive signals. Accordingly, the baseband processor 1120 and the RF processor 1110 may be referred to as a transmitter, a receiver, a transceiver, a communication unit, or a wireless communication unit.

The backhaul communication unit 1130 provides an interface for performing communication with other nodes in a network.

The storage unit 1140 stores data, such as a default program, an application, and configuration information for operating the main gNB. In particular, the storage unit 1140 may store information on a bearer allocated to a connected UE, a measurement result reported from a connected UE, and the like. In addition, the storage unit 1140 may store information as a criterion for determining whether to provide or stop a multi-connection to a UE. The storage unit 1140 provides stored data upon request from the controller 1150.

The controller 1150 controls overall operations of the main gNB. For example, the controller 1150 transmits and receives signals through the baseband processor 1120 and the RF processor 1110 or through the backhaul communication unit 1130. Further, the controller 1150 records and reads data in the storage unit 1140. To this end, the controller 1150 may include at least one processor.

Figure 12:
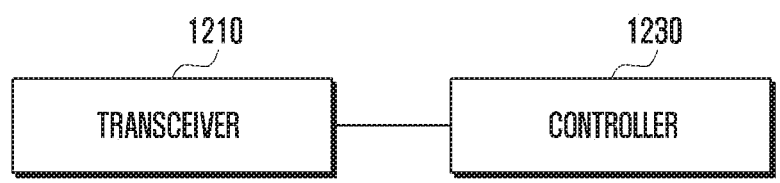
FIG. 12 illustrates a network apparatus according to an embodiment of the disclosure.

FIG. 12 illustrates the configuration of a network entity according to an embodiment of the disclosure. The network entity may be at least one of an S-GW, a P-GW, a router, or a base station.

Referring to FIG. 12, the network entity may include a transceiver 1210 and a controller 1230. The transceiver 1210 may be referred to as a transceiving device or a communication unit. The network entity may transmit and receive a signal, a packet, data, or the like through the transceiver 1210. The controller 1230 may control the operation of the network entity. The controller 1230 may control the operation of the network entity according to various embodiments of the disclosure. The controller 1230 may include at least one processor. For a specific operation of the network entity, operations of a network entity according to various embodiments of the disclosure are illustrated for reference.

The controller 1230 determines whether congestion occurs. When congestion occurs, the controller 1230 may determine whether congestion control is supported based on a downlink packet related to the congestion. When the congestion control is supported, the controller 1230 may identify an uplink packet related to the congestion and may perform control to update a congestion-related field of a header of the identified uplink packet. When an ECN field of an IP header of a downlink packet related to the congestion is 01 or 10, it may be determined that the congestion control is supported. The congestion-related field may include an ECE field of a TCP header, and the network apparatus may set an ECE flag in the ECE field to indicate that the congestion occurs.

When the congestion control is supported, the controller 1230 may perform control to update the ECN field of the downlink packet related to the congestion from 01 or 10 to 11. Further, when an ECN field of a downlink packet received from an upper node is 11, the controller 1230 may determine that congestion has occurred in the upper node and may perform control to update the congestion-related field based on the occurrence of the congestion in the upper node.

The controller 1230 may perform control to identify the ECN field of the downlink packet only which the congestion occurs. The controller 1230 may identify the uplink packet related to the congestion based on at least one of a transmitter and a receiver of the downlink packet related to the congestion.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

The invention claimed is:

1. A method performed by a network apparatus, the method comprising:
   detecting a congestion;
   selecting a first internet protocol (IP) flow among a plurality of IP flows for a congestion control based on counter values of each of the plurality of IP flows;
   determining whether the congestion control is supported for the first IP flow based on a first downlink packet of the first IP flow;
   identifying a first uplink packet of a second IP flow in case that the congestion control is supported for the first IP flow;
   updating a congestion-related field of a header of the first uplink packet from a first value to a second value, wherein the congestion-related field of the header of the first uplink packet indicates a reduction of a transmission window related to the first IP flow;
   transmitting the first uplink packet including the congestion-related field with the second value;
   identifying whether a congestion window reduced flag is set to 1 in a second downlink packet of the first IP flow after transmitting the first uplink packet including the congestion-related field with the second value; and
   transmitting a second uplink packet including the congestion-related field with the second value, in case that the congestion window reduced flag is not set to 1 in the second downlink packet of the first IP flow.

2. The method of claim 1, wherein the congestion control is supported in case that an explicit congestion notification (ECN) field of an IP header of the first downlink packet of the first IP flow is 01 or 10.

3. The method of claim 1, further comprising:
   updating an ECN field of the first downlink packet of the first IP flow from 01 or 10 to 11 in case that the congestion control is supported for the first IP flow.

4. The method of claim 1,
   wherein the congestion-related field comprises an ECN-echo (ECE) field of a transmission control protocol (TCP) header, and
   wherein an ECE flag is set in the ECE field to indicate that the congestion is detected.

5. The method of claim 2, further comprising:
   determining that congestion is detected in an upper node in case that the ECN field of the IP header of the first downlink packet received from the upper node is 11,
   wherein the congestion-related field is updated based on a detection of the congestion in the upper node.

6. The method of claim 1, wherein an ECN field of the first downlink packet is identified only in case that the congestion is detected.

7. The method of claim 1, wherein the first uplink packet is selected based on at least one of a quality of service (QoS) policy.

8. The method of claim 1, wherein the network apparatus comprises at least one of a base station, a router, or a gateway.

9. A network apparatus comprising:
   a transceiver configured to transmit and receive a signal; and
   a controller configured to:
      detect a congestion,
      select a first internet protocol (IP) flow among a plurality of IP flows for a congestion control based on counter values of each of the plurality of IP flows,
      determine whether the congestion control is supported for the first IP flow based on a first downlink packet of the first IP flow,
      identify a first uplink packet of a second IP flow in case that the congestion control is supported for the first IP flow,
      update a congestion-related field of a header of the first uplink packet from a first value to a second value, wherein the congestion-related field of the header of the first uplink packet indicates a reduction of a transmission window related to the first IP flow,
      transmit the first uplink packet including the congestion-related field with the second value,
      identify whether a congestion window reduced flag is set to 1 in a second downlink packet of the first IP flow after transmitting the first uplink packet including the congestion-related field with the second value, and
      transmit a second uplink packet including the congestion-related field with the second value, in case that the congestion window reduced flag is not set to 1 in the second downlink packet of the first IP flow.

10. The network apparatus of claim 9, wherein the congestion control is supported in case that an explicit congestion notification (ECN) field of an IP header of the first downlink packet of the first IP flow is 01 or 10.

11. The network apparatus of claim 9, wherein the controller is further configured to update an ECN field of the first downlink packet of the first IP flow from 01 or 10 to 11 in case that the congestion control is supported for the first IP flow.

12. The network apparatus of claim 9,
   wherein the congestion-related field comprises an ECN-echo (ECE) field of a transmission control protocol (TCP) header, and
   wherein an ECE flag is set in the ECE field to indicate that the congestion is detected.

13. The network apparatus of claim 10, wherein the controller is further configured to:
   determine that congestion is detected in an upper node in case that the ECN field of the IP header of the first downlink packet received from the upper node is 11; and
   update the congestion-related field based on a detection of the congestion in the upper node.

14. The network apparatus of claim 9, wherein the controller is further configured to identify an ECN field of the first downlink packet only in case that the congestion is detected.

15. The network apparatus of claim 9,
   wherein the first uplink packet is selected based on at least one of a quality of service (QoS) policy.

16. The network apparatus of claim 9, wherein the network apparatus comprises at least one of a base station, a router, or a gateway.

* * * * *